US012268269B2

(12) United States Patent
Craigie et al.

(10) Patent No.: US 12,268,269 B2
(45) Date of Patent: Apr. 8, 2025

(54) SYSTEM FOR FORMING A DEEP DRAWN HELMET

(71) Applicant: Galvion Incorporated, Montreal (CA)

(72) Inventors: Elaine Violet Craigie, Gatineau (CA); Grzegorz Czeremuszkin, Pierrefonds (CA); Vlad Lucuta, Newport, VT (US); Thomas Moynihan, Dover, NH (US); Mohamed Latreche, Dollard des Ormeaux (CA); Enrick Gauthier, Laval (CA)

(73) Assignee: GALVION INCORPORATED, Montreal (CA)

( * ) Notice: Subject to any disclaimer, the term of this patent is extended or adjusted under 35 U.S.C. 154(b) by 0 days.

(21) Appl. No.: 18/498,627

(22) Filed: Oct. 31, 2023

(65) Prior Publication Data
US 2024/0057709 A1 Feb. 22, 2024

Related U.S. Application Data

(63) Continuation of application No. 17/742,012, filed on May 11, 2022, now Pat. No. 11,832,677.
(Continued)

(51) Int. Cl.
B29C 51/08 (2006.01)
A42C 2/00 (2006.01)
(Continued)

(52) U.S. Cl.
CPC ............ A42C 2/005 (2013.01); B29C 70/446 (2013.01); B29C 2791/002 (2013.01); B29C 2791/006 (2013.01); B29L 2031/4821 (2013.01)

(58) Field of Classification Search
CPC ................ B29C 70/446; B29C 70/462; B29C 2043/147; B29C 43/183; B29C 43/184;
(Continued)

(56) References Cited

U.S. PATENT DOCUMENTS 2,378,642 A 6/1945 Kopplin
2,452,999 A 11/1948 Daly et al.
(Continued)

FOREIGN PATENT DOCUMENTS

CN 1434282 A1 8/2003
DE 630473 C 5/1936
(Continued)

OTHER PUBLICATIONS

CA Examiner's Report corresponding to Application No. 3,167,174, dated Oct. 19, 2023, 6 pages (English Translation).
(Continued)

Primary Examiner — Matthew J Daniels
(74) Attorney, Agent, or Firm — DAY PITNEY LLP; George N. Chaclas

(57) ABSTRACT

A system for forming a deep drawn helmet and method therefor are disclosed. The system includes a forming draw ring and a non-forming draw ring and supports a prepreg stack between a forming aperture of the forming draw ring and a non-forming aperture of the non-forming draw ring. The system clamps a flange portion of the prepreg stack between a contact surface of the forming draw ring and a contact surface of the non-forming draw ring, which forms a clamped assembly of the rings and the prepreg stack. The system then forms a deep drawn helmet preform from the prepreg stack of the clamped assembly. The same system or a different forming system then consolidates one or more of the preforms into a final deep drawn helmet. The system can
(Continued)

control sliding of the flange during forming of the helmet preform without reducing the flange clamping force.

13 Claims, 16 Drawing Sheets

Related U.S. Application Data

(60) Provisional application No. 63/187,729, filed on May 12, 2021.

(51) Int. Cl.
*B29C 70/44* (2006.01)
*B29L 31/48* (2006.01)

(58) Field of Classification Search
CPC ............ B29C 2043/3615; B29C 51/08; B29C 51/085; B29C 51/082
See application file for complete search history.

(56) References Cited

U.S. PATENT DOCUMENTS

| | | | |
|---|---|---|---|
| 2,468,697 | A | 4/1949 | Wiley |
| 2,666,951 | A | 1/1954 | Grove |
| 2,814,043 | A | 11/1957 | Alesi |
| 3,018,210 | A | 1/1962 | Frieder et al. |
| 3,154,788 | A | 11/1964 | Simpson |
| 3,264,392 | A | 8/1966 | Taplin |
| 3,349,153 | A | 10/1967 | Rudolf |
| 3,383,705 | A | 5/1968 | Raschke |
| 3,726,953 | A | 4/1973 | Jones et al. |
| 3,758,889 | A | 9/1973 | Erb |
| 4,023,209 | A | 5/1977 | Frieder, Jr. et al. |
| 4,263,679 | A | 4/1981 | Erlendson |
| 4,449,787 | A | 5/1984 | Burbo et al. |
| 4,888,831 | A | 12/1989 | Oleson |
| 4,942,628 | A | 7/1990 | Freund |
| 4,943,222 | A | 7/1990 | Nathoo |
| 5,042,093 | A | 8/1991 | Legendre |
| 5,151,277 | A | 9/1992 | Bernardon et al. |
| 5,315,718 | A | 5/1994 | Barson et al. |
| 5,551,094 | A | 9/1996 | Navone |
| 5,572,749 | A | 11/1996 | Ogden |
| 5,578,158 | A | 11/1996 | Gutowski et al. |
| 5,581,819 | A | 12/1996 | Garneau |
| 5,601,852 | A | 2/1997 | Seemann |
| 5,683,831 | A | 11/1997 | Baril et al. |
| 5,794,272 | A | 8/1998 | Workman et al. |
| 5,898,949 | A | 5/1999 | Barthold et al. |
| 6,032,297 | A | 3/2000 | Barthold et al. |
| 6,081,931 | A | 7/2000 | Burns et al. |
| 6,292,952 | B1 | 9/2001 | Watters et al. |
| 6,807,838 | B2 | 10/2004 | Iwaya |
| 6,968,575 | B2 | 11/2005 | Durocher |
| 6,981,863 | B2 | 1/2006 | Renault et al. |
| 7,124,449 | B2 | 10/2006 | Sutter et al. |
| 7,178,175 | B2 | 2/2007 | Rogers et al. |
| 7,770,239 | B1 | 8/2010 | Goldman et al. |
| 8,020,220 | B2 | 9/2011 | McElroy et al. |
| 8,353,066 | B2 | 1/2013 | Rogers et al. |
| 8,739,318 | B2 | 6/2014 | Durocher |
| 8,826,463 | B2 | 9/2014 | Teetzel et al. |
| 8,984,665 | B2 | 3/2015 | Celona et al. |
| 9,003,858 | B1 | 4/2015 | Lin et al. |
| 9,101,175 | B2 | 8/2015 | Redpath et al. |
| 9,216,523 | B2 | 12/2015 | Monforte, II et al. |
| 9,247,779 | B1 | 2/2016 | Aloumanis et al. |
| 9,307,803 | B1 * | 4/2016 | Folgar ..................... B29C 43/02 |
| 9,364,975 | B2 | 6/2016 | Preisler et al. |
| 10,079,488 | B2 | 9/2018 | Challancin |
| 10,165,817 | B2 | 1/2019 | Redpath et al. |
| 10,448,695 | B2 | 10/2019 | Folgar |
| D900,407 | S | 10/2020 | Hanudel et al. |
| 10,928,163 | B2 | 2/2021 | Zimmer |
| 2003/0070200 | A1 | 4/2003 | Crye et al. |
| 2005/0217006 | A1 | 10/2005 | Sutter et al. |
| 2005/0255770 | A1 | 11/2005 | Crump |
| 2006/0101556 | A1 | 5/2006 | Goldsborough |
| 2006/0101560 | A1 | 5/2006 | Ketterer et al. |
| 2008/0263752 | A1 | 10/2008 | Solinsky et al. |
| 2009/0178740 | A1 | 7/2009 | Lenze et al. |
| 2009/0222978 | A1 | 9/2009 | Fang |
| 2010/0083413 | A1 | 4/2010 | McGovern |
| 2010/0229286 | A1 | 9/2010 | Ahlgren et al. |
| 2011/0072548 | A1 | 3/2011 | Hersick et al. |
| 2011/0094018 | A1 | 4/2011 | Rogers et al. |
| 2011/0197327 | A1 | 8/2011 | McElroy et al. |
| 2011/0277222 | A1 | 11/2011 | Garneau et al. |
| 2012/0002046 | A1 | 1/2012 | Rapoport et al. |
| 2012/0011631 | A1 | 1/2012 | Crossman et al. |
| 2012/0144565 | A1 | 6/2012 | Huh |
| 2012/0144567 | A1 | 6/2012 | Huh |
| 2012/0167281 | A1 | 7/2012 | Gennrich et al. |
| 2012/0174294 | A1 | 7/2012 | Sackett |
| 2013/0000016 | A1 | 1/2013 | Hall et al. |
| 2013/0239303 | A1 | 9/2013 | Cotterman et al. |
| 2014/0130241 | A1 | 5/2014 | Abdollahi et al. |
| 2014/0240834 | A1 | 8/2014 | Mason |
| 2015/0157079 | A1 | 6/2015 | Auranen et al. |
| 2015/0246384 | A1 | 9/2015 | Ikeda et al. |
| 2016/0075338 | A1 | 3/2016 | Henn |
| 2016/0295948 | A1 | 10/2016 | Dowd et al. |
| 2017/0027268 | A1 | 2/2017 | Folgar |
| 2017/0269460 | A1 | 9/2017 | Fagerkvist |
| 2018/0235304 | A1 | 8/2018 | Fischer et al. |
| 2018/0308397 | A1 | 10/2018 | Sugimoto et al. |
| 2020/0008508 | A1 | 1/2020 | Havola |
| 2020/0019236 | A1 | 1/2020 | Parkinson et al. |
| 2020/0197997 | A1 | 6/2020 | Zhou et al. |
| 2021/0037905 | A1 | 2/2021 | Ward et al. |
| 2021/0247618 | A1 | 8/2021 | Moore et al. |
| 2022/0071336 | A1 | 3/2022 | Franzino et al. |

FOREIGN PATENT DOCUMENTS

| | | |
|---|---|---|
| DE | 8138228 U1 | 6/1983 |
| GB | 1114214 A | 5/1968 |
| WO | 2016016445 A2 | 2/2016 |
| WO | 2018173313 A1 | 9/2018 |
| WO | 2020109887 A1 | 6/2020 |
| WO | 2020237189 A1 | 11/2020 |
| WO | 2022115531 A1 | 6/2022 |

OTHER PUBLICATIONS

International Preliminary Report on Patentability corresponding to Application No. PCT/US2022/028754, dated Nov. 23, 2023, 11 pages.
CA Office Action corresponding to Application No. 3,218,744, dated Nov. 30, 2023, 5 pages.
Dangora, Lisa .M., et al., "Deep-Drawing Forming Trials on a Cross-Ply Thermoplastic Lamina for Helmet Preform Manufacture", Journal of Manufacturing Science and Engineering, vol. 139, Mar. 2017, 8 pages.
International Preliminary Report on Patentability corresponding to Application No. PCT/US2021/016807, dated Jul. 28, 2022, 8 pages.
International Search Report and Written Opinion corresponding to Application No. PCT/US2022/28754, dated Aug. 29, 2022, 12 pages.
International Search Report and Written Opinion in corresponding Application No. PCT/US2023/061745, dated Jul. 28, 2023, 15 pages.
International Search Report and Written Opinion corresponding to Application No. PCT/IB2013/003041, dated on Feb. 9, 2015, 12 pages.
International Search Report and Written Opinion corresponding to Application No. PCT/US2021/016807, dated on Dec. 28, 2021, 11 pages.

(56) References Cited

OTHER PUBLICATIONS

Kriechenbauer et al., "Deep drawing with superimposed low-frequency vibrations on servo-screw presses" 11th International Conference on Technology of Plasticity, ICTP 2014, Oct. 19-24, 2014, Nagoya Congress Center, Nagoya, Japan, Procedia Engineering vol. 81, 2014, pp. 905-913.

Lu et al., "A Novel Surface Texture Shape for Directional Friction Control" Tribology Letters, 2018, vol. 66, No. 51, 13 pages.

Patel et al., "Parametric Analysis of Deep Drawing Process for Hemisphere Dome Shape of Steel AISI 1023", Journal of Basic and Applied Engineering Research, vol. 1, No. 2, Oct. 2014, pp. 9-16.

EP Extended Search Report corresponding to Application No. 22209825.3, dated Apr. 13, 2023, 7 pages.

\* cited by examiner

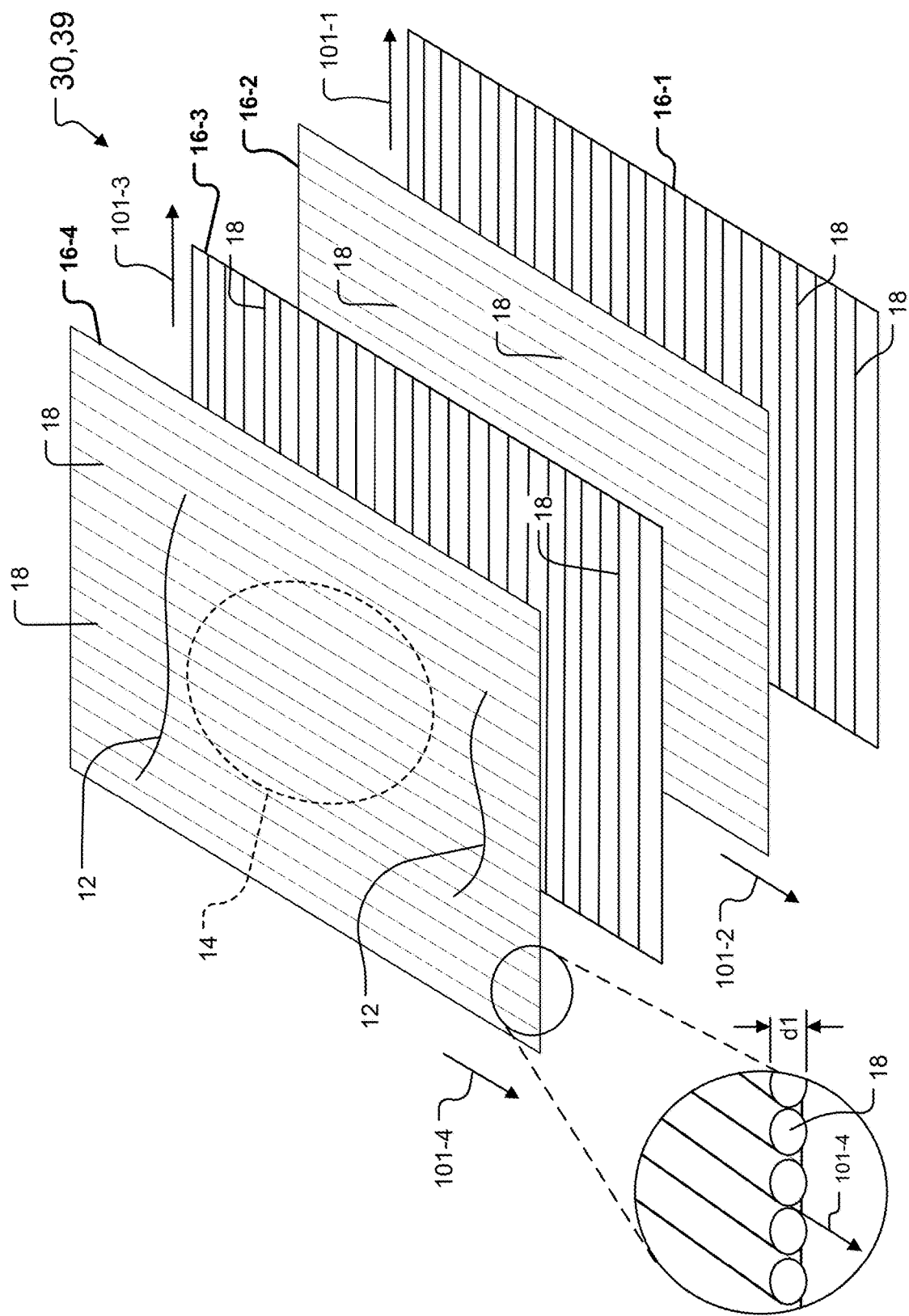

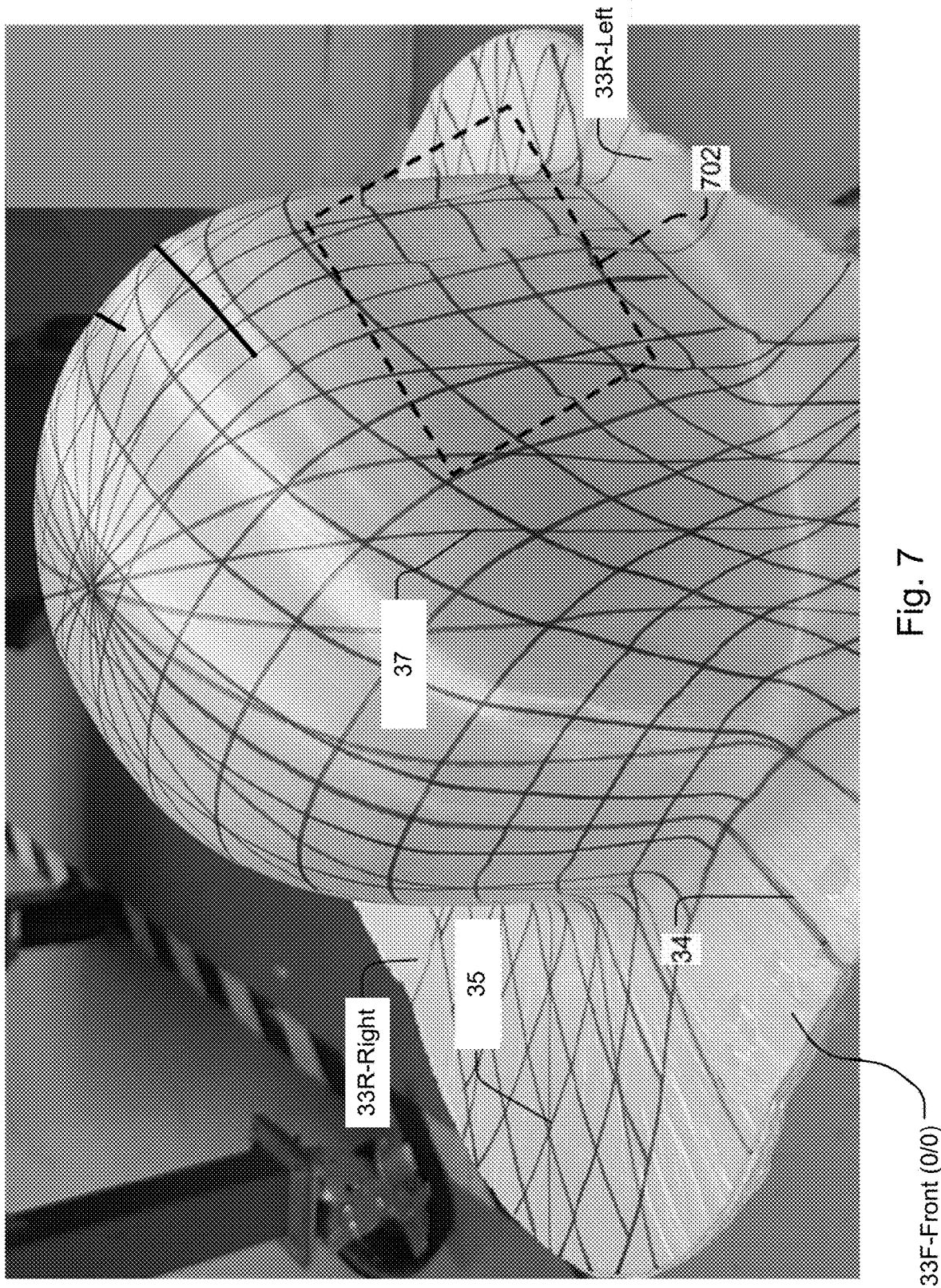

SYSTEM FOR FORMING A DEEP DRAWN HELMET

1 CROSS REFERENCE TO RELATED U.S. PATENT APPLICATIONS

This application is a continuation of and claims the benefit of U.S. patent application Ser. No. 17/742,012 filed May 11, 2022, which claims priority to and the benefit of U.S. Provisional Application No. 63/187,729 filed May 12, 2021, which is incorporated herein by reference in its entirety.

2 BACKGROUND OF THE INVENTION

Deep drawing has traditionally been a process for forming a three-dimensional finished article from a two-dimensional sheet of metal material, also known as a blank. For this purpose, the blank is placed in a machine press and typically drawn into a forming die by the mechanical action of a punch. The finished article is a hollow vessel with a three-dimensional shape that mirrors that of the forming die.

The process of drawing two-dimensional metal blanks into three-dimensional articles is generally referred to as "deep drawing" when the depth of the finished article is roughly equal to or possibly exceeds its diameter. Finished metal articles produced from this process include household and industrial sinks and tubs, aluminum soda cans, and various industrial parts including cups and automotive fuel tanks, in examples.

Other materials such as plastics can also be used as blanks in deep drawing machine presses and systems to create deep drawn articles. For this purpose, the plastic blanks are typically heated before the start of the drawing process to make the blanks more pliable.

3 SUMMARY OF THE INVENTION

More recently, various helmet forming systems have been proposed to produce helmets as deep drawn articles from blanks of resin-impregnated materials such as fiber materials. These existing helmet forming systems typically first create an intermediate helmet preform from the blanks and then further mold/remold the helmet preform into a final helmet shape via a consolidation process. For this purpose, the fiber materials of the blanks are typically included in separate flat sheets, or "plies" that are stacked on top of one another. Because the plies are pre-impregnated with resin and stacked, these blanks are also known as prepreg stacks.

A description of a recent helmet forming system and its operation is as follows. The system includes a machine press with a pressurized forming chamber, a holder ring and a punch. The punch has a top surface with a predefined shape and dimensions of an inside of the helmet preform to be created. A prepreg stack is placed on the holder ring. The forming chamber is located above the holder ring and has a rubber diaphragm that faces the top surface of the prepreg stack. The punch is located below the holder ring. The machine press moves the forming chamber and diaphragm against the prepreg stack, while also moving the punch upwards through an opening in the holder ring, which forces the material of the prepreg stack into the chamber. The system creates a helmet preform at the chamber under heat and pressure.

The existing helmet forming systems then mold the helmet preform into the final helmet shape via a process known as consolidation. For this purpose, the helmet preform is usually heated and cooled under pressure to create the final shape of the helmet.

These existing helmet forming systems have limitations. The limitations include wrinkling and bridging of the helmet preforms during formation, non-uniform coverage and density of the prepreg material across the preform, and the relatively long time required (e.g., almost an hour or more) to create each helmet preform and the final helmet shape, in examples.

The helmet preforms produced by the existing helmet forming systems are susceptible to wrinkling. Wrinkling is a permanent and undesired change to the normally continuous and ordered arrangement of fibers of the prepreg during the formation of the helmet preform. Wrinkling can occur when the retention of the unidirectional sheets or fabric of the flat prepreg stack is insufficient during formation, if there is an accumulation of excess material around the circumference, or the fibers of one sheet or "ply" of the prepreg stack are oriented offset to the fibers of an adjacent ply, in examples. Inadequate material retention and material accumulation results in buckling around the circumference of the helmet preform which degrades its ballistic performance. Similarly, fiber orientation is intentional in the prepreg stack to encourage material deformation during forming and to prevent wrinkling.

Wrinkling usually occurs at vertical sidewalls of the helmet preform and is most visible at its outside surface. Because the load transferring capability of the preform is weakened in areas of wrinkling, the ability of the finished helmet to withstand ballistic impacts at these areas is also weakened. Because wrinkling cannot be fixed by reheating and redrawing the helmet preform and also cannot be fixed during the consolidation process, helmet preforms with areas of wrinkling that are above acceptable threshold limits cannot be used and must be thrown away.

Bridging of the helmet preform is also an issue for the existing helmet forming systems. Bridging is a defect in the helmet preform that typically occurs at areas of the preform with concave curvature and manifests as a non-uniformity in thickness. Helmets that are free of bridging defects are characterized by substantially the same material thickness throughout. As with wrinkling, bridging of the helmet preform cannot be fixed during consolidation.

Yet another limitation of existing helmet forming systems is the common practice of using "slits and darts" in the prepreg ply pattern design to minimize wrinkling. While this practice can minimize wrinkling in the cut areas, it creates short fibers which weaken the ballistic and structural integrity in these areas.

A novel system and method for forming a deep drawn helmet from a prepreg stack is proposed. The proposed helmet forming system includes a forming draw ring and a non-forming draw ring. When the system is in a starting state, a prepreg stack without any slits or seams is disposed between the forming draw ring and the non-forming ring. In more detail, the prepreg stack is supported between a forming aperture of the forming draw ring and a non-forming aperture of the non-forming draw ring.

Then, cylinders of the helmet forming system clamp a flange portion of the prepreg stack between a contact surface of the forming draw ring and a contact surface of the non-forming draw ring, the result of which forms a clamped assembly that includes the forming draw ring, the prepreg stack, and the non-forming draw ring. The cylinders then advance the prepreg stack of the clamped assembly relative to a punch. The punch has an external surface formed in the shape of the inside of a helmet preform to be created. In one example, the punch is stationary and the system moves the clamped assembly towards the punch; in another example, the clamped assembly is stationary, and the system moves the punch towards the clamped assembly.

When a drawn portion of the prepreg stack reaches a desired distance measured upwards from the contact surface of the forming draw ring, also known as a desired drawing depth, the system forms a deep drawn helmet preform from the prepreg stack of the clamped assembly.

After the helmet preform is created, the helmet preform is formed into a final helmet shell shape ("helmet") via a separate consolidation process. During the consolidation process, the helmet preform is exposed to high pressure and temperature. In one example, the helmet preform is placed into a mold with a matched set of dies, an outer die and an inner die. The outer die has a final cavity that defines the outer shape of the helmet, and the bottom die has a core that defines the inner shape of the helmet.

The proposed helmet forming system overcomes the limitations of the existing helmet forming systems. The system also minimizes wrinkling, bridging and other forms of non-uniformity of the helmet preform without requiring the conventional dart cuts and slits in the raw material plies. The absence of darts and slits mitigates potentially weak areas caused by discontinuous short fibers employed in conventional slitted helmet manufacturing methods and thus can improve upon ballistic properties of the final helmet article as compared to existing helmets formed from slitted prepreg materials.

In embodiments, the proposed system can create a helmet preform in two or more variable drawing rate drawing steps, in a variable rate drawing step, or in a continuous fixed rate drawing step, all of which can minimize typical forming defects such as wrinkling, bridging and thickness variation.

In another example, the prepreg stack is preformed and enclosed in a vacuum bag to minimize contamination. Prior to preforming, the vacuum bag and prepreg stack are purged of air that can otherwise become trapped between the plies and/or between the layers and fibers of the plies. The vacuum bag has been shown to reduce process variability by maintaining the organization of the individual reinforcement layers within the plies of the prepreg stack. The vacuum bag can reduce wrinkling in the resulting helmet preform by modifying friction between the prepreg stack and the tool.

In another example, the prepreg stack is oriented relative to alignment markers of at least one of the draw rings to control material flow, wrinkling and shear deformation during helmet preforming. The orientation of the prepreg stack is performed to maximize process repeatability and the structural and ballistic properties of the helmet preform and the final helmet shell article.

In other embodiments, a body of the forming draw ring has an inner perimeter surface that is curved and an extended portion that rises above the level of the body. These aspects can minimize wrinkling and bridging during forming of the helmet preform by forcing the prepreg stack to conform to the punch in areas that are concave. In another example, various surface features are incorporated into a surface of one or both draw rings that comes into contact with the flange portion of the prepreg stack during formation of the helmet preform. These surface features are configured to promote controlled material flow of the flange portion inwards towards the center of the draw rings during drawing, which can also minimize wrinkling.

In still other examples, the pressure applied to the prepreg stack during formation of the helmet preform can vary as a function of time, and/or as a function of draw depth, to also minimize wrinkling and fiber reorientation. In yet another example, multiple locations of the draw rings relative to the helmet preform, or "zones," can be cooled and/or heated independently during the forming of the helmet preform. The punch can also be heated and cooled independently from the draw rings.

In still another example, an orientation of the prepreg stack relative to a front surface of the non-forming draw ring, in conjunction with selected operational parameters, can tailor the ballistic and non-ballistic properties of the helmet preform to be created.

The final deep drawn helmet may be comprised of one or more deep drawn helmet preforms. When multiple helmet preforms are used, each of the preforms might use different oriented materials, with possibly different orientations of fibers in two or more of the multiple helmet preforms, in examples. An assembly of the one or more deep drawn helmet preforms can then be bonded during a consolidation process to create the deep drawn helmet.

In general, according to one aspect, the invention features a helmet forming system for creating a deep drawn helmet preform. The system includes a forming draw ring and a non-forming draw ring. Each of the rings includes a rigid body bounded by a contact surface and a non-contact surface opposed to the contact surface. A stack of prepreg material ("prepreg stack") is supported between a forming aperture of the forming draw ring and a non-forming aperture of the non-forming draw ring. The system also includes a controller that directs the system to advance the forming draw ring and the non-forming draw ring towards one another to form a clamped assembly of the forming draw ring, the prepreg stack and the non-forming draw ring. In the clamped assembly, a flange portion of the prepreg stack is clamped between the contact surfaces of the rings.

The controller directs advancement of the prepreg stack relative to a punch to form the deep drawn helmet preform. During the advancement, the system applies a clamping force to the clamped assembly, and the punch enters and passes through the non-forming aperture and then draws the prepreg stack through the forming aperture until a desired drawing depth of the prepreg stack is achieved.

The helmet forming system also includes a temperature control system under control of the controller that is connected to the punch, the forming draw ring and the non-forming draw ring. The temperature control system provides heating and cooling, and the temperature control system is configured to independently control the temperature of the punch, the forming draw ring and the non-forming draw ring. Preferably, the forming draw ring and/or the non-forming draw ring include different temperature control zones, and the temperature control system is configured to independently control each of the temperature control zones.

In one embodiment, the controller directs advancement of the prepreg stack relative to the punch by directing movement of the clamped assembly towards the punch, where the punch is stationary during the drawing. In another embodiment, the controller directs advancement of the prepreg stack relative to the punch by directing movement of the punch towards the clamped assembly, where the clamped assembly is stationary during the drawing.

In one implementation, the helmet forming system can control a clamping pressure at the flange during drawing by advancing the prepreg stack relative to the punch at a substantially constant rate and changing the clamping force applied to the clamped assembly as a function of drawing depth. Additionally and/or alternatively, the helmet forming system can control a clamping pressure at the flange during drawing by either advancing the clamped assembly relative to the punch at a substantially constant rate and changing the clamping force applied to the clamped assembly over time, or by advancing the clamped assembly relative to the punch at different rates during the drawing and changing the clamping force applied to the clamped assembly.

In embodiments, the contact surface of the forming draw ring and/or the contact surface of the non-forming draw ring include(s) surface features that control sliding of the flange portion of the prepreg stack between the contact surfaces of the rings during the drawing.

The helmet forming system also includes a means for enclosing and sealing the prepreg stack under vacuum prior to drawing. The prepreg stack preferably includes one or more plies of oriented prepreg material arranged along specific axes, where a specific orientation of the prepreg stack is aligned relative to a punch coordinate axis prior to the forming of the deep drawn helmet preform.

The helmet forming system also includes a pressure vessel under control of the controller. The pressure vessel includes a sealing mechanism that the system urges against the non-contact surface of the forming draw ring during the drawing. Additionally or alternatively, the pressure vessel is attached to the non-contact surface of the forming draw ring, with pressure controlled during the drawing by the controller.

In another embodiment, the helmet forming system includes a counterpunch that is under control of the controller. The counterpunch has an internal surface shaped to correspond with a section of the desired shape of the deep drawn helmet preform, where the controller directs the system to urge the counterpunch against an outside ply of the prepreg stack as the prepreg stack nears the desired drawing depth.

In another embodiment, the helmet forming system includes an assembly of forming rings that functions as the forming draw ring, where the assembly of forming rings creates an extended surface which guides the prepreg stack during the drawing.

In yet another embodiment, the draw ring assembly includes an adjustable ring that is connected to and is under control of the controller. The controller can adjust the ring to modify the forming aperture during the drawing.

In general, according to another aspect, the invention features a method for creating a deep drawn helmet from a stack of prepreg material layers ("prepreg stack"). In this method, the prepreg stack is supported between a forming aperture of a forming draw ring and a non-forming aperture of a non-forming draw ring. A flange portion of the prepreg stack is clamped between a contact surface of the forming draw ring and a contact surface of the non-forming draw ring, the result of which forms a clamped assembly of the forming draw ring, the prepreg stack, and the non-forming draw ring. The prepreg stack is then advanced relative to a punch to form the deep drawn helmet preform, during which the system applies a clamping force to the clamped assembly, and during which the punch enters and passes through the non-forming aperture and then draws an inner portion of the prepreg stack through the forming aperture until a desired drawing depth of the prepreg stack is achieved.

In general, according to another aspect, the invention features a system for forming a stack of prepreg material layers ("prepreg stack") into a deep drawn helmet preform. The system includes a punch, a forming draw ring, a non-forming draw ring, and a controller. The punch includes a rigid body formed with an external surface thereof shaped to correspond with a desired internal surface of the helmet preform. The forming draw ring and the non-forming draw ring each include a rigid body bounded by a contact surface and a non-contact surface opposed to the contact surface.

In the system, the prepreg stack is supported and clamped between a forming aperture of the forming draw ring and a non-forming aperture of the non-forming draw ring to form a clamped assembly of the forming draw ring, the prepreg stack and the non-forming draw ring. The controller directs advancement of the prepreg stack relative to the punch to form the deep drawn helmet preform, during which the system applies a clamping force to the clamped assembly, and during which the punch enters and passes through the non-forming aperture and then draws an inner portion of the prepreg stack through the forming aperture until a desired drawing depth of the prepreg stack is achieved.

In general, according to yet another aspect, the invention features a method for creating a ballistic helmet. In this method, a stack of prepreg materials ("prepreg stack") is supported between a forming aperture of a forming draw ring and a non-forming aperture of a non-forming draw ring. A flange portion of the prepreg stack is clamped between a contact surface of the forming draw ring and a contact surface of the non-forming draw ring, the result of which forms a clamped assembly of the forming draw ring, the prepreg stack, and the non-forming draw ring. The prepreg stack of the clamped assembly is then advanced relative to a punch to form a deep drawn helmet preform. A helmet is then created from one or more deep drawn helmet preforms via a consolidation process.

4 BRIEF DESCRIPTION OF THE DRAWINGS

The features of the present invention will best be understood from a detailed description of the invention and example embodiments thereof selected for the purposes of illustration and shown in the accompanying drawings in which:

FIG. 3B is an exploded perspective view of a typical UHMWPE fiber-based cross-ply within an exemplary prepreg stack, where the ply includes four unidirectional layers of prepreg fibers;

FIG. 3C is an inset view of a ply in the prepreg stack in FIG. 3B, where the inset view shows more idealized detail for individual fibers arranged within a top layer of the ply;

Figure 1:
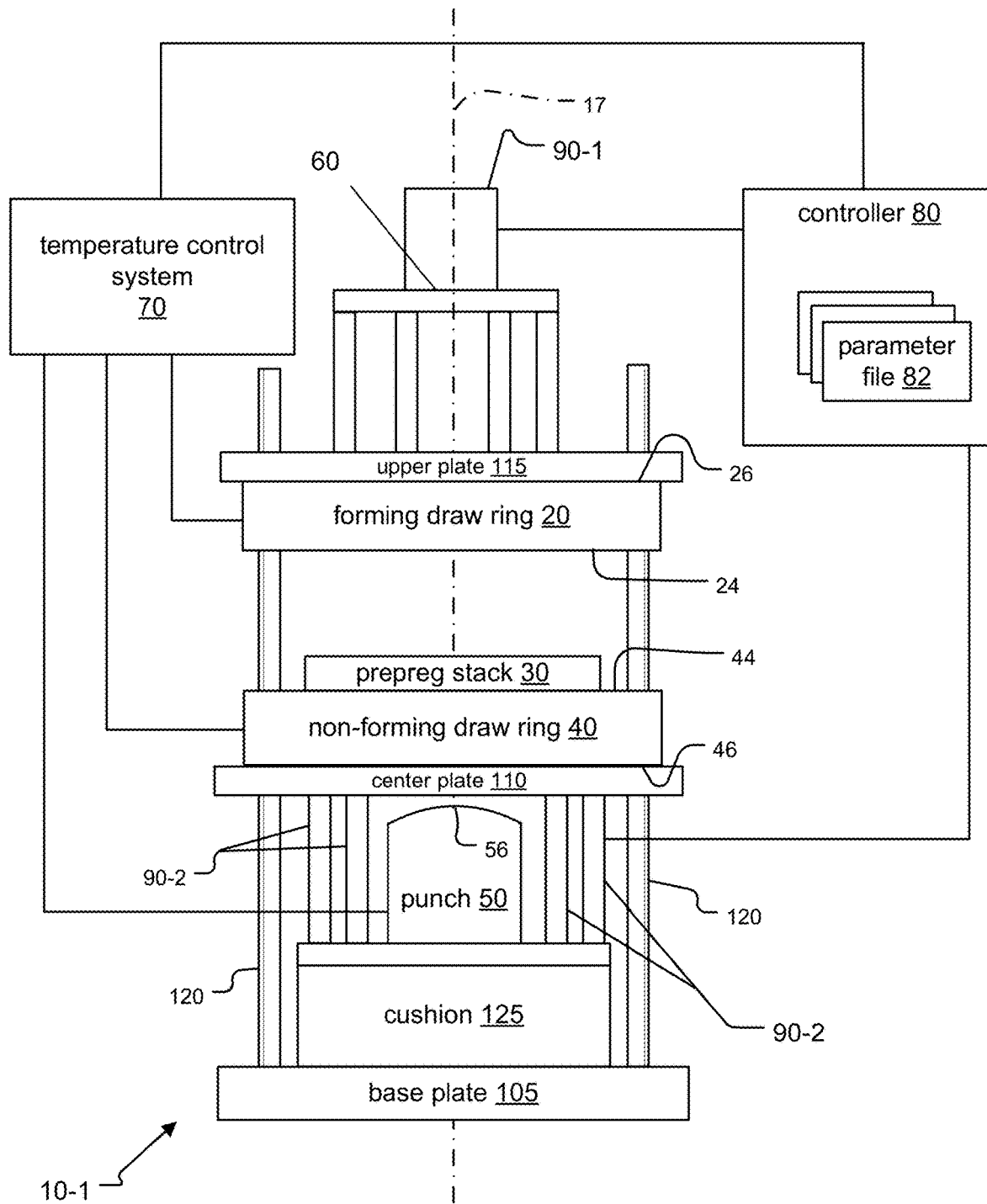
FIG. 1 is a schematic diagram of a system for forming a deep drawn helmet preform ("helmet forming system"), constructed in accordance with principles of the present invention.
Figure 4:
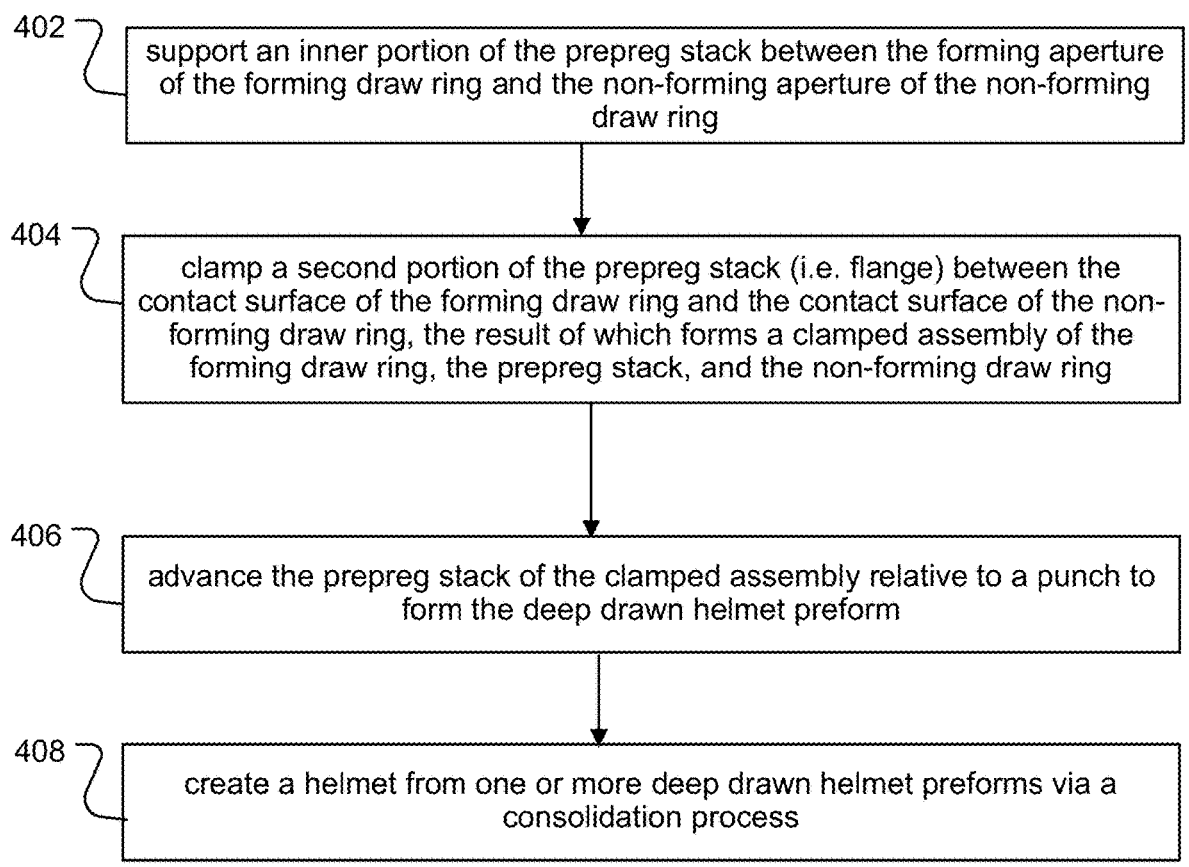
FIG. 4 is a flow chart that describes a method of operation of the helmet forming system for forming a deep drawn helmet from a prepreg stack in accordance with principles of the present invention, where the system creates an intermediate deep drawn helmet preform from the prepreg stack and then forms the helmet preform into the helmet via a consolidation process.
Figure 5A:
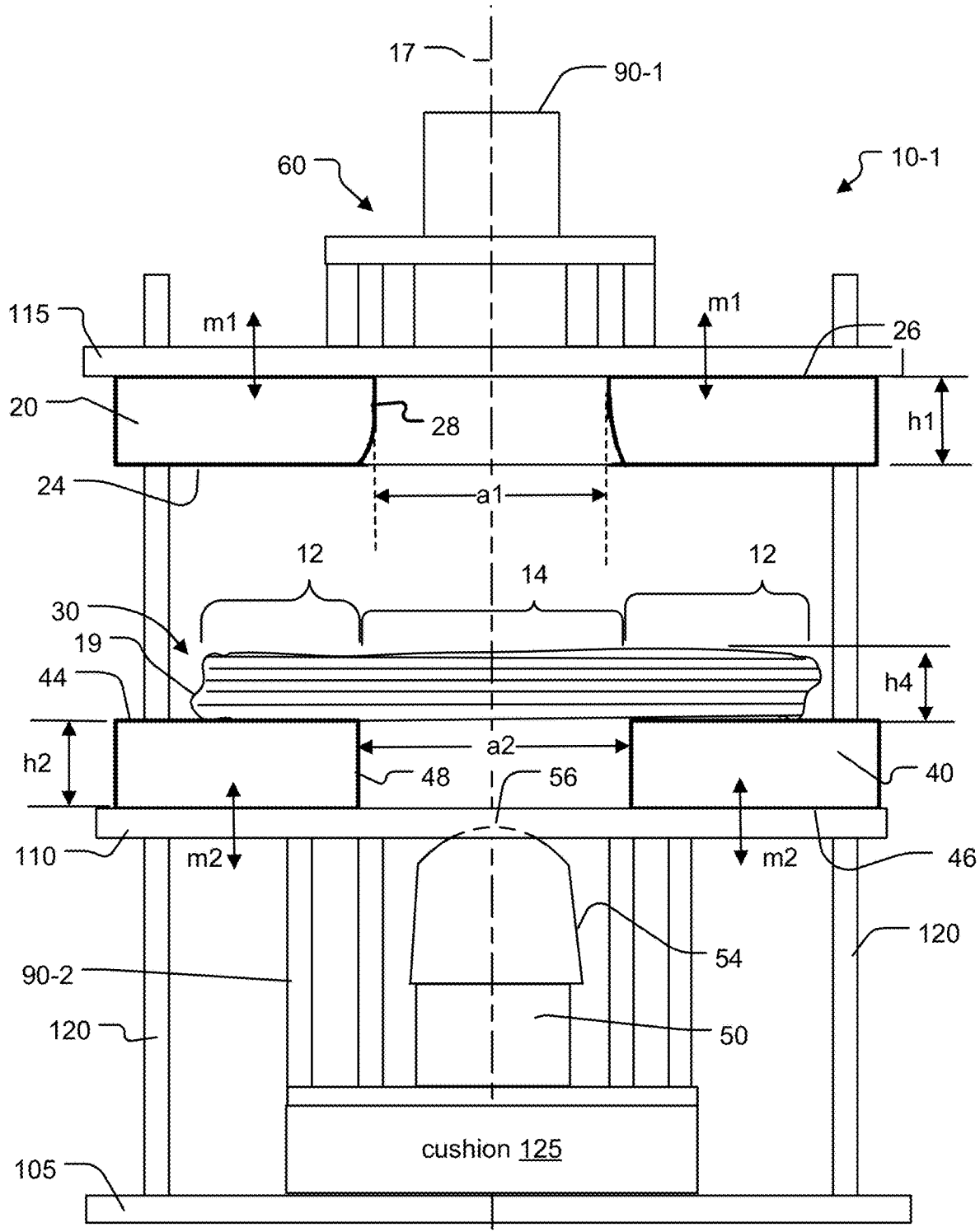
Figure 5B:
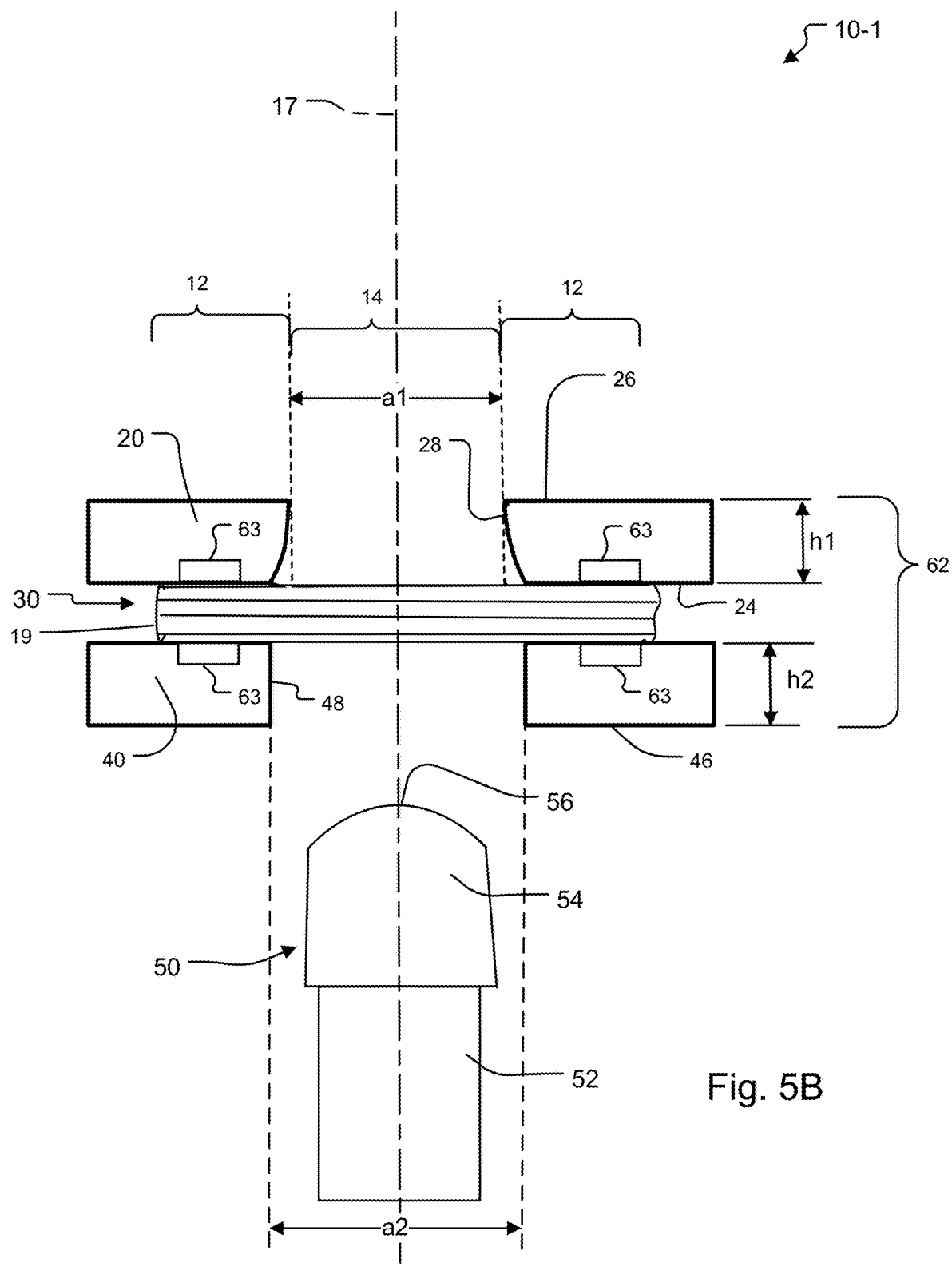
Figure 5C:
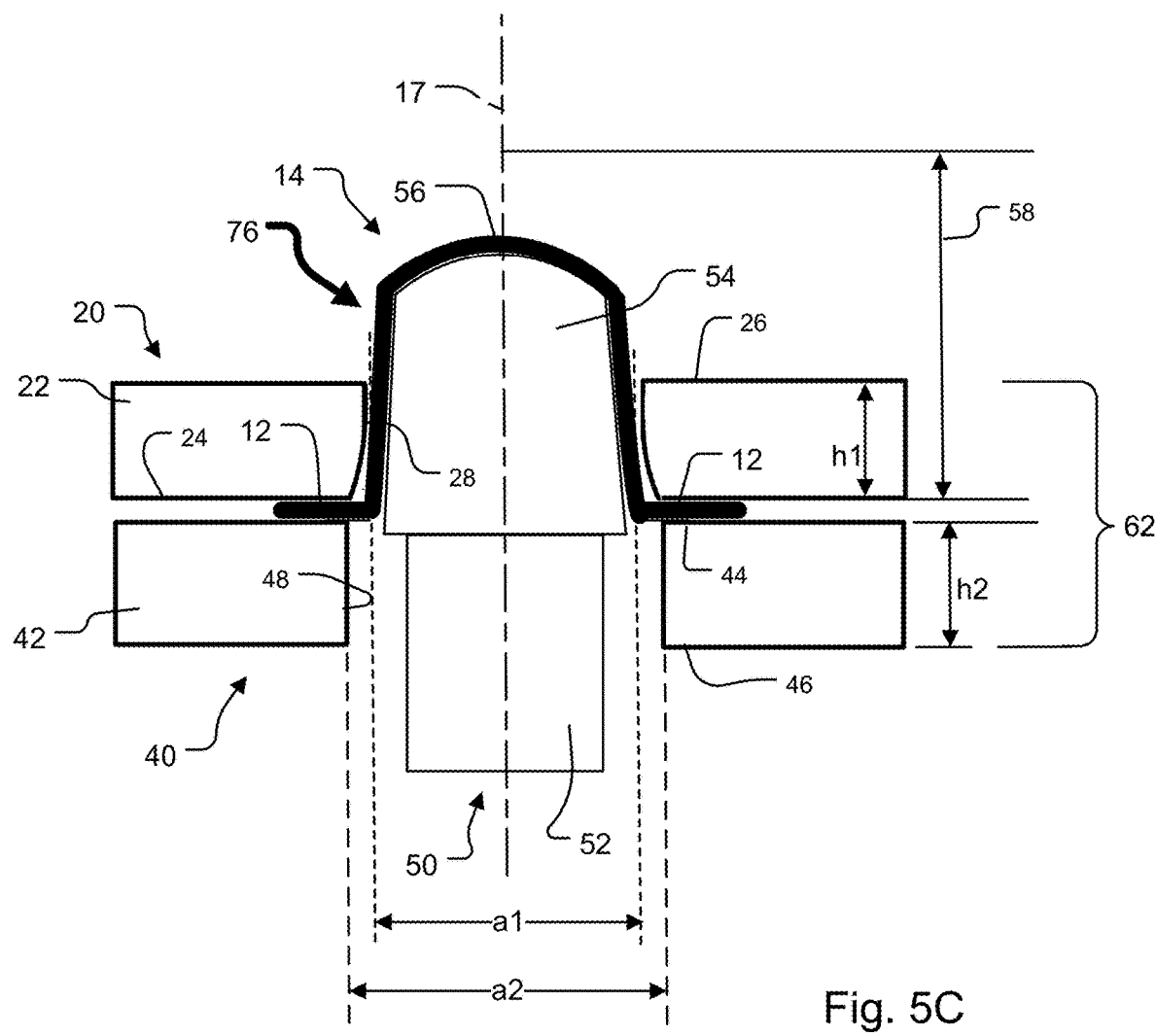
Figure 5D:
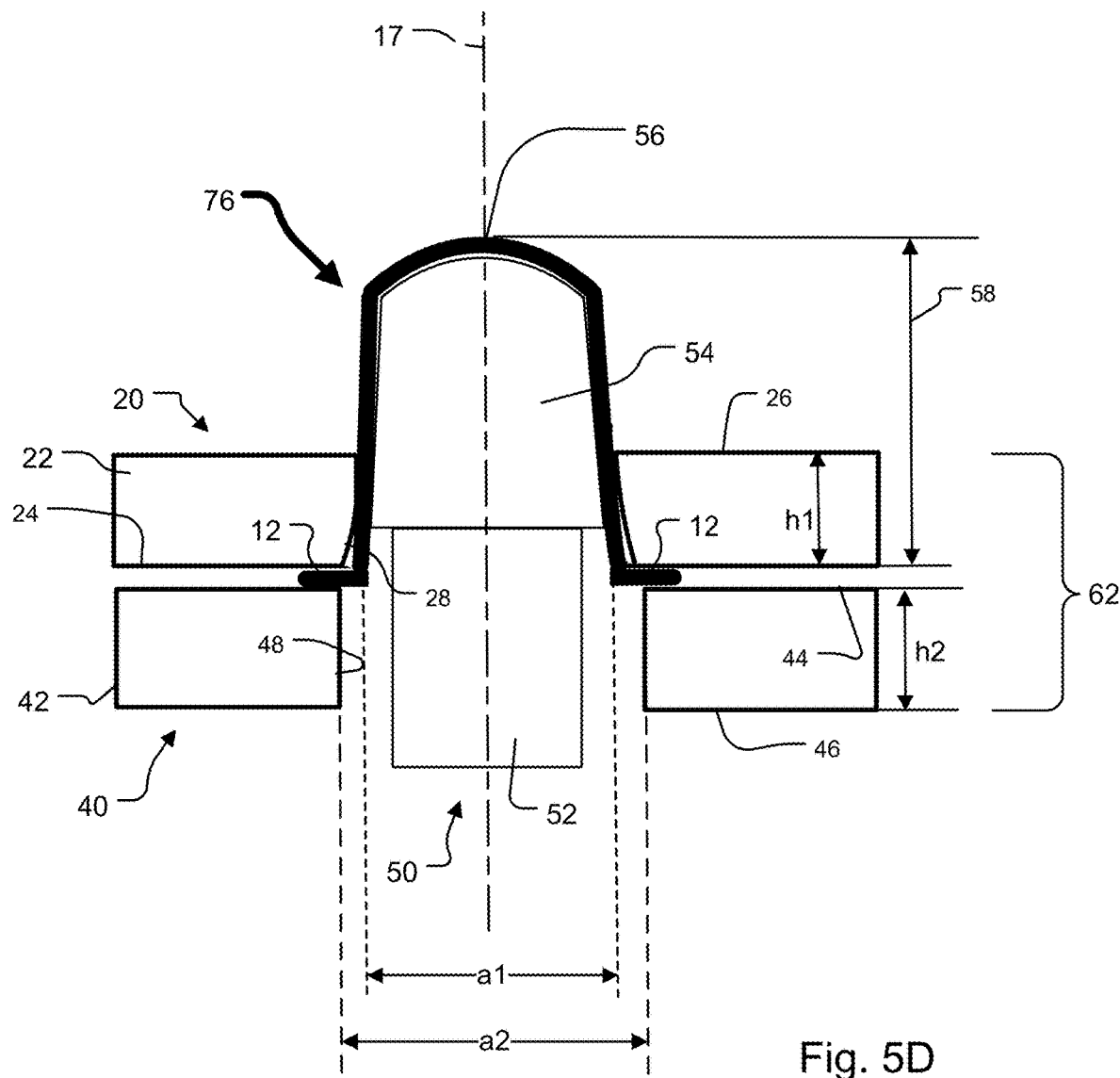
Figure 6:
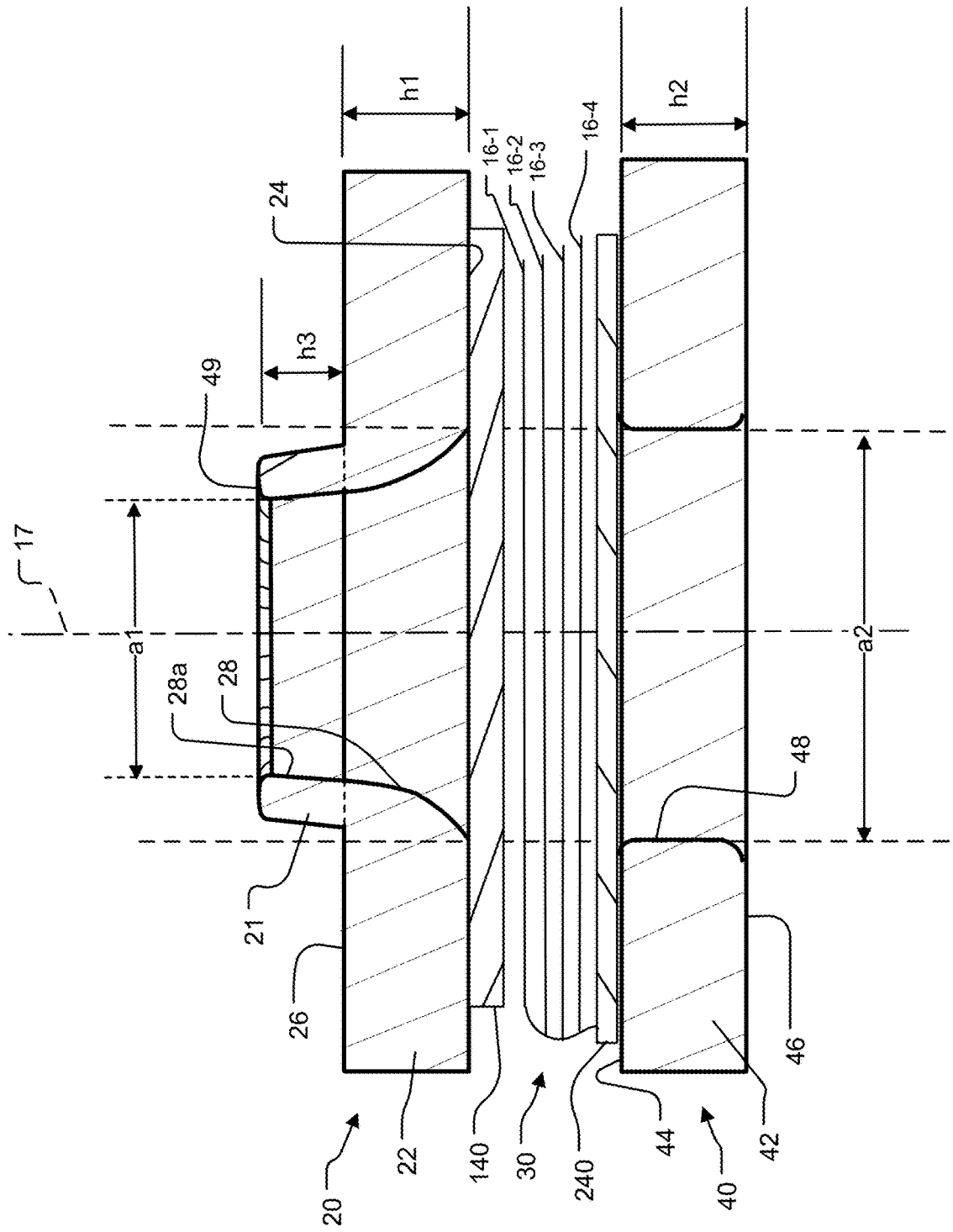
Figure 9A:
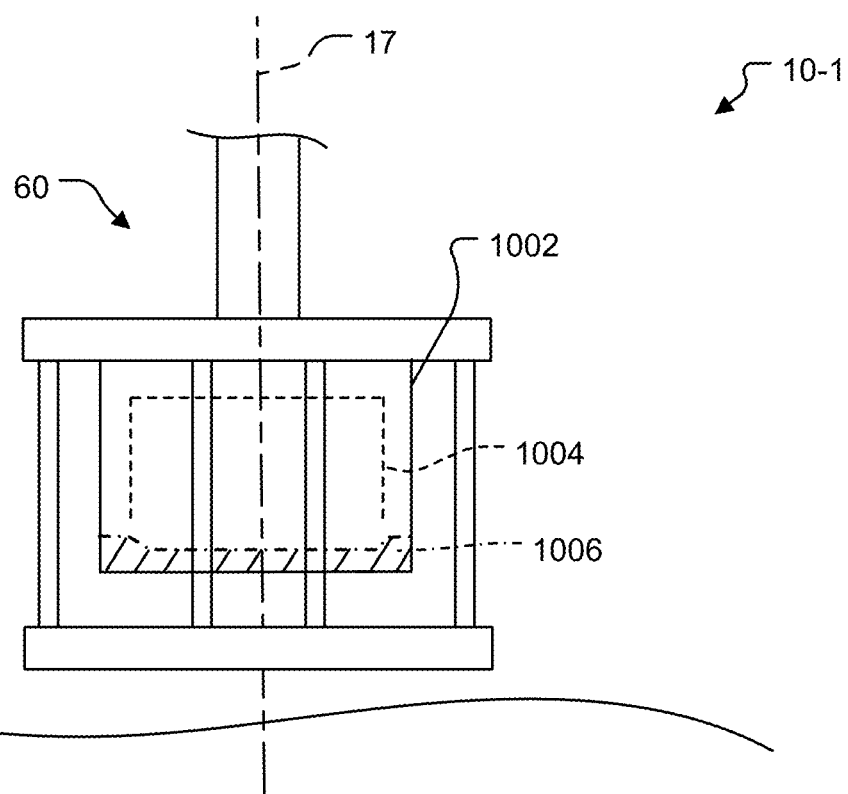
Figure 9B:
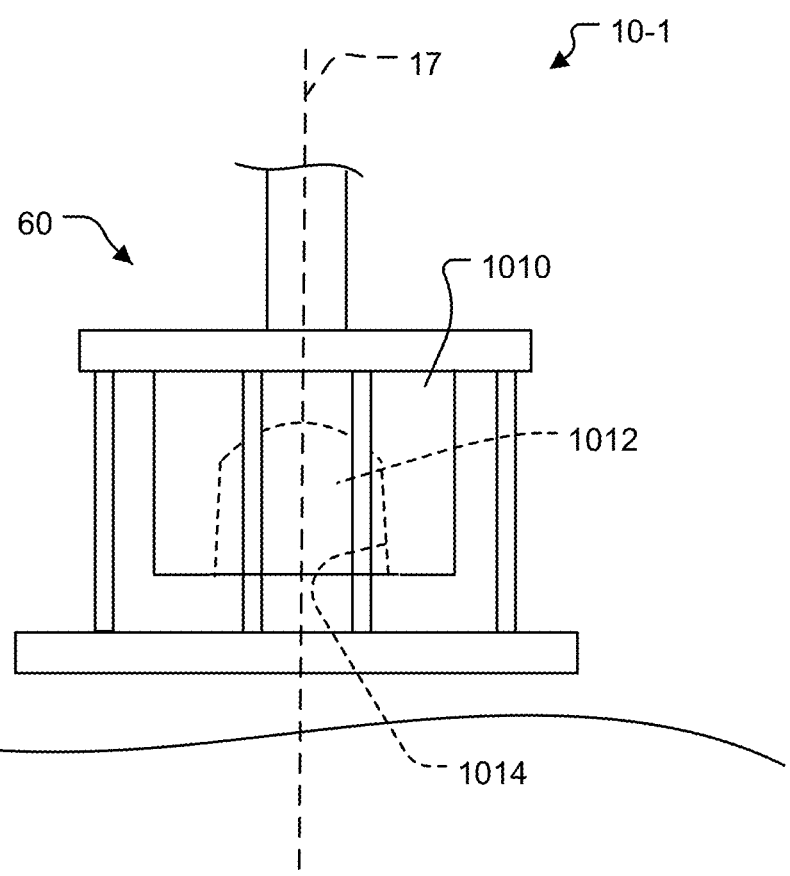
Figure 10:
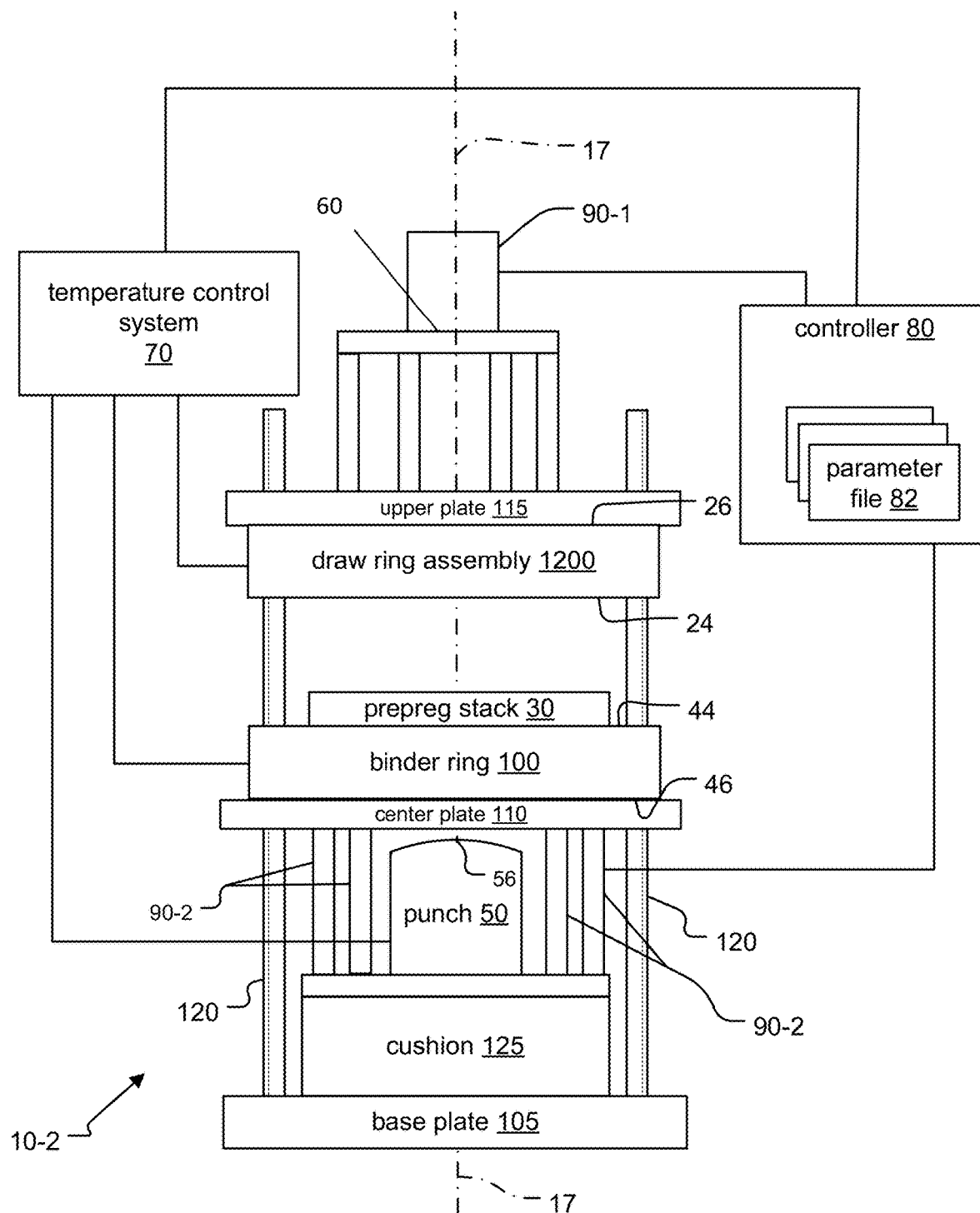
Figure 11A:
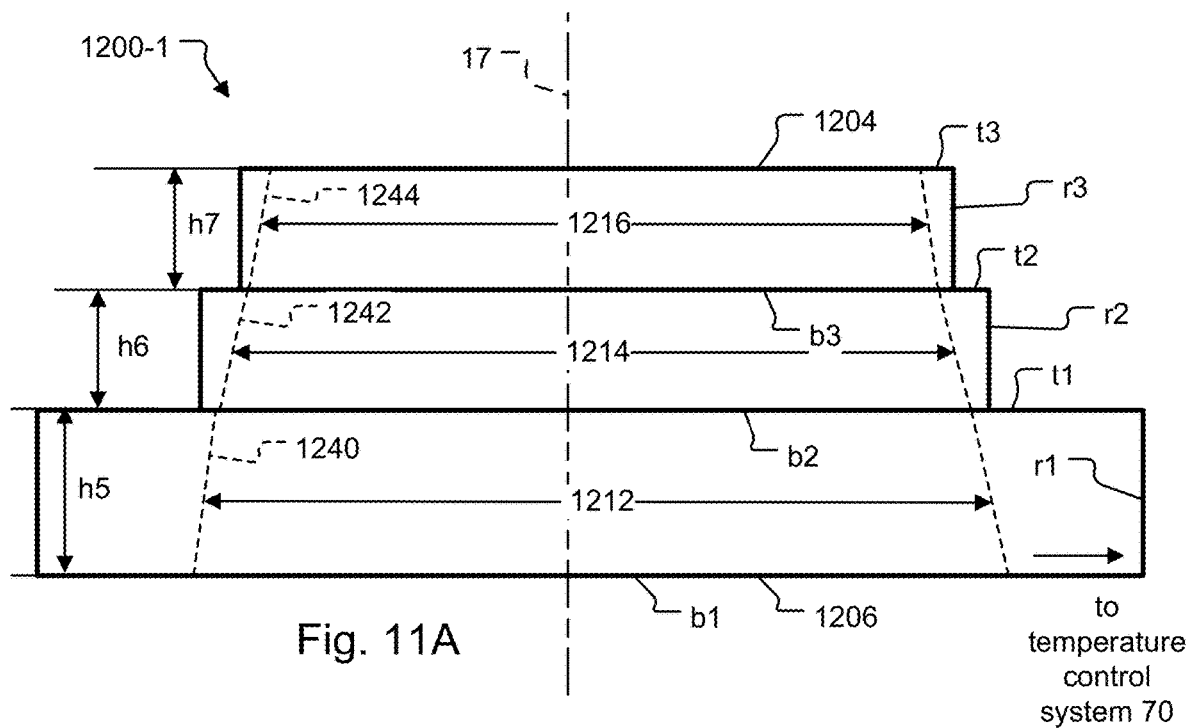
Figure 11B:
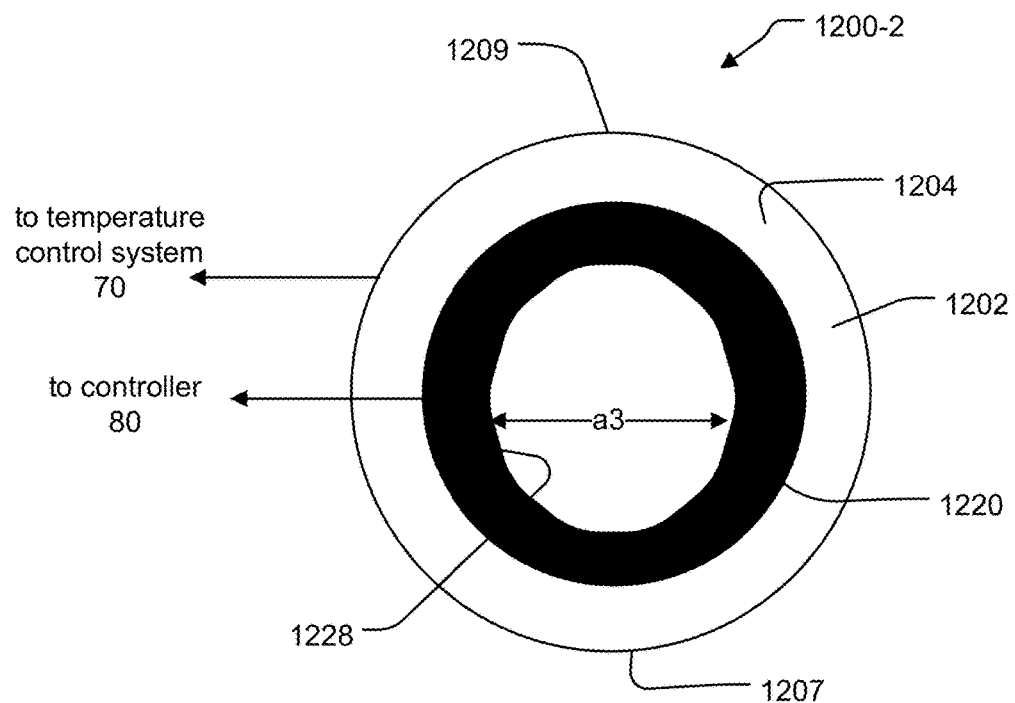
Figure 12B:
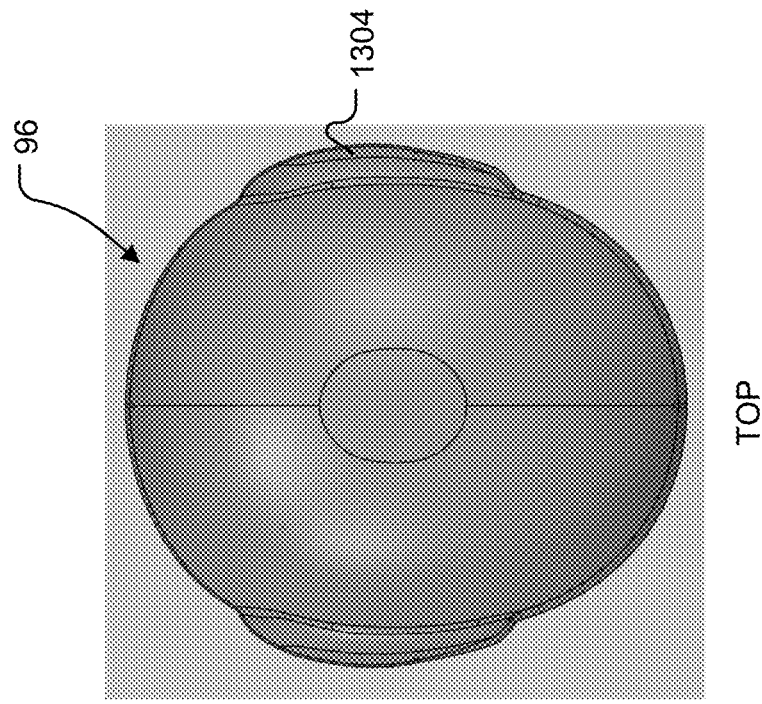
Figure 12A:
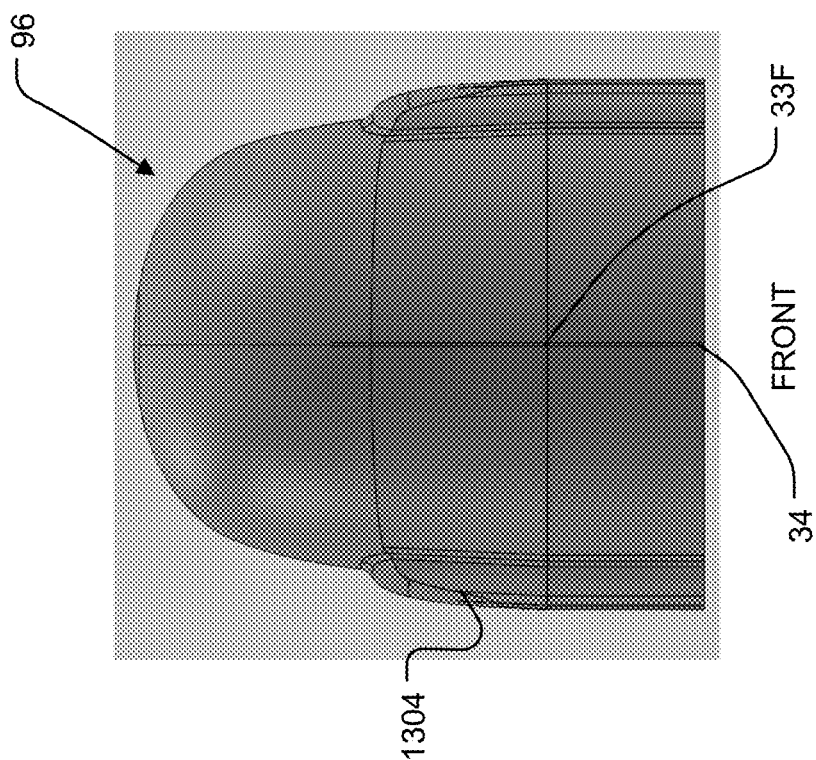

FIG. 5A-5D are schematic diagrams that show more detail for and illustrate stages of the operation of the helmet forming system in FIG. 1 to create a helmet preform, where: FIG. 5A shows an initial state of the system when the prepreg stack is loaded between the forming draw ring and the non-forming draw ring; FIG. 5B shows how cylinders of the system urge contact surfaces of the draw rings into mating contact with the prepreg stack to form a clamped assembly; FIG. 5C shows how the cylinders advance the clamped assembly as a unit towards and upon a punch of the system, where the figure also shows a partially formed, deep drawn helmet preform created as a result of the advancement; and FIG. 5D shows a final forming stage with a completed helmet preform;

FIG. 6 is a magnified, front cross-sectional view of an exemplary clamped assembly in the helmet forming system, where a sacrificial layer is added between the contact surface of the forming draw ring and the prepreg stack prior to clamping, and where different embodiments of both the forming draw ring and the non-forming draw ring are shown;

FIG. 7 is a perspective view of a deep drawn helmet preform that is created according to the method of FIG. 4;

FIG. 8A-8D are perspective cross-sectional views of an exemplary draw ring, where each of the figures show different surface features of the contact surface of the draw ring for improving controlled sliding of the flange portion of the prepreg stack during formation of the helmet preform;

FIGS. 9A and 9B respectively show a pressure vessel and a counterpunch included within the helmet forming system of FIG. 1;

FIG. 10 is a block diagram of another helmet forming system, constructed in accordance with principles of the present invention;

FIG. 11A is a front view of an exemplary draw ring assembly in the helmet forming system of FIG. 10;

FIG. 11B is a top view of another exemplary draw ring assembly in the helmet forming system of FIG. 10; and FIGS. 12A and 12B are front and top views of a deep drawn helmet formed from a helmet preform in accordance with the method of FIG. 4, where the helmet forming system or a different system creates the completed helmet from the helmet preform via a consolidation process.

5 DESCRIPTION OF SOME EMBODIMENTS OF THE INVENTION

5.1 Item Number List

The following reference numbers are used throughout, unless specifically indicated otherwise.

| Description/label | Reference number |
|---|---|
| forming aperture (of forming draw ring) | a1 |
| non- forming aperture (of nonforming draw ring) | a2 |
| forming aperture (of draw ring assembly) | a3 |
| bottom (of draw rings) | b1, b2, b3 |
| ring height (forming draw ring) | h1 |
| ring height (of nonforming draw ring) | h2 |
| height (of extended portion) | h3 |
| height (of prepreg stack) | h4 |
| height (of draw ring r1) | h5 |
| height (of draw ring r2) | h6 |
| height (of draw ring r3) | h7 |
| movement | m1, m2 |
| draw ring | r1, r2, r3 |
| separator (of rings) | s, s1, s2, s3, s4 |
| top (of draw rings) | t1, t2, t3 |
| zone (of rings) | z, z1, z2, z3, z4 |
| flange (of prepreg stack) | 12 |
| top layer (of prepreg stack) | 16-4 |
| inner portion (of prepreg stack) | 14 |
| bottom layer (of prepreg stack) | 16-1 |
| helmet forming system | 10-1, 10-2 |
| punch longitudinal axis | 17 |
| fibers (of prepreg stack) | 18 |
| vacuum bag | 19 |
| forming draw ring | 20 |
| extended portion (of forming draw ring) | 21 |
| rigid body (of forming draw ring) | 22 |
| outside perimeter (of forming draw ring) | 23 |
| contact surface (of forming draw ring) | 24 |
| non-contact surface (of forming draw ring) | 26 |
| extended perimeter surface (of forming draw ring) | 28a |
| middle layer(s) (of prepreg stack) | 16-2, 16-3 |
| front side (of forming draw ring) | 27 |
| inner perimeter surface (of forming draw ring) | 28 |
| back side (of forming draw ring) | 29 |
| prepreg stack | 30 |
| origin (of marked grid) | 31 |
| marked grid | 32 |
| back (of prepreg stack) | 33B |
| front (of prepreg stack) | 33F |
| left side (of prepreg stack) | 33L |
| right side (of prepreg stack) | 33R |
| 0-degree direction | 34 |
| −45-degree direction | 35 |
| 90-degree direction | 36 |
| 45-degree direction | 37 |
| ply | 39 |
| nonforming draw ring | 40 |
| rigid body (of nonforming draw ring) | 42 |
| outside perimeter (of nonforming draw ring) | 43 |
| second alignment feature | 45-2 |
| contact surface (of nonforming draw ring) | 44 |
| first alignment feature | 45-1 |
| non-contact surface (of nonforming draw ring) | 46 |
| front side (of nonforming draw ring) | 47 |
| inner perimeter surface (of nonforming draw ring) | 48 |
| top (of extended portion of forming ring) | 49 |
| punch | 50 |
| back side (of nonforming draw ring) | 51 |
| punch riser | 52 |
| external surface (of punch) | 54 |
| crown (of punch) | 56 |
| drawing depth | 58 |
| ram system | 60 |
| clamped assembly | 62 |
| load cell | 63 |
| temperature control system | 70 |
| helmet preform | 76 |
| controller | 80 |
| left side, right side (of non-forming draw ring) | 41L, 41R |
| parameter file | 82 |
| base cylinder | 90-2 |
| ram cylinder | 90-1 |
| deep-draw helmet | 96 |
| binder ring | 100 |
| base plate | 105 |
| center plate | 110 |
| upper plate | 115 |
| guide rail set | 120 |
| cushion | 125 |
| sacrificial layer | 140 |
| sacrificial layer | 240 |
| fiber axis | 101-1, 101-2, 101-3, 101-4 |
| wrinkling area (of helmet preform) | 702 |
| radial direction | 802 |
| pressure vessel | 1002 |
| chamber (of pressure vessel) | 1004 |
| counterpunch | 1010 |
| cavity (of counterpunch) | 1012 |
| inside surface (of cavity) | 1014 |

-continued

| Description/label | Reference number |
| --- | --- |
| rigid body (of draw ring assembly) | 1202 |
| non-contact surface (of draw ring assembly) | 1204 |
| contact surface (of draw ring assembly) | 1206 |
| front (of draw ring assembly) | 1207 |
| back (of draw ring assembly) | 1209 |
| adjustment means (of draw ring assembly) | 1220 |
| earcup portion | 1304 |
| draw ring assembly | 1200-1, 1200-2 |
| inner perimeter surface (of draw ring assembly) | 1228, 1240, 1242, 1244 |
| adjustable ring | 1220 |

FIG. 1, in a non-limiting exemplary embodiment, shows a schematic diagram for a helmet forming system 10-1. Various components of the helmet forming system 10-1 and their connections are shown.

The helmet forming system 10-1 includes various components. These components include a ram system 60, a forming draw ring 20 and a non-forming draw ring 40, a prepreg stack 30, a base plate 105, a center plate 110, an upper plate 115, a guide rail set 120, a cushion 125, a controller 80 and a temperature control system 70. Additional components include a punch 50, a ram cylinder 90-1 and base cylinders 90-2. The base cylinders 90-2 operate as cushion pins and are actuated by a plate inside the cushion 125.

The forming draw ring 20 has a contact surface 26 and a non-contact surface 24. The non-forming draw ring 40 has a contact surface 44 and a non-contact surface 46.

Connections and relationships between the components are as follows. The ram cylinder 90-1 and the base cylinders 90-2 are in communication with and controlled by the controller 80. The prepreg stack 30 is located between the forming draw ring 20 and the non-forming draw ring 40 and is and is supported by the non-forming draw ring in a start position. The temperature control system 70 interfaces with each of the forming draw ring 20, the non-forming draw ring 40 and the punch 50 and is in communication with the controller 80. The ram cylinder 90-1 is attached to the ram system 60 and is in communication with and operated by the controller 80 to move the ram system 60 upward and downward along a punch longitudinal axis 17.

The upper plate 115 is attached to the ram system 60 and is movably supported and guided by the guide rail set 120 when the ram cylinder 90-1 moves the ram system. The forming draw ring 20 is attached to the upper plate 115 with the non-contact surface 26 of the forming draw ring 20 in mating contact with the upper plate 115. The base cylinders 90-2 are actuated by the cushion 125 which may be located above or below the base plate 105. The center plate 110 is actuated by the base cylinders 90-2, which are controlled by the controller 80, and motion is guided by the guide rail set 120. The non-forming draw ring 40 is attached to the center plate 110 with the non-contact surface 46 of the non-forming draw ring 40 in mating contact with the center plate 110.

Both the upper plate 115 and the center plate 110 include center apertures that are aligned with respect to the punch longitudinal access 17. Each of the apertures are sufficiently large to receive the punch 50 without the punch coming into contact with the plates 110, 115. For this purpose, the punch 50 has a diameter that measured across the punch 50 in a direction that is substantially perpendicular to the punch longitudinal axis 17; the diameters of both apertures are thus slightly larger than the punch diameter.

The guide rail set 120 is fixedly attached to the base plate 105. The guide rail set 120 include a plurality of guide rails disposed along an axis that is parallel with the punch longitudinal axis 17. Each guide rail passes through the center plate 110 and the upper plate 115. In the illustrated example, the center plate 110 and the upper plate 115 include guide rail apertures formed to receive the guide rail therethrough and are configured to minimize radial movement between the guide rail apertures and the guide rails. The non-forming draw ring 40 and the forming draw ring 20 are aligned with the punch longitudinal axis 17 via the guide rail set 120. Each of the center plate 110, the non-forming draw ring 40, the forming draw ring 20 and the upper plate 115 is movable, actuated by the base cylinders 90-2 and the ram cylinder 90-1 for vertical displacement (up and down) along the along the punch longitudinal axis 17.

In another example, the ram cylinder 90-1, the base plate 105 and the base cylinders 90-2 are pre-aligned and no guide rail set 120 is included. The upper plate 115 and the center plate 110 may also be removed. Such a tooling feature allows alignment of components of the system and creation of helmet preforms with fewer components and thus at lower cost.

The controller 80 includes a processor and a memory (not shown), and parameter files 82 for configuring and controlling operation of the helmet forming system 10-1. Each parameter file 82 includes specific parameters that a technician selects for configuring the system and its components. For this purpose, the controller 80 has an interface such as a graphical user interface (GUI) that enables the technician to select existing parameter files 82 within the controller 80 and change the parameters of a selected file. Via the GUI, the technician can also select parameter files 82 configured on an external computer system for uploading to the controller 80. Examples of external computer systems include a mobile phone, laptop or tablet.

In one example, the controller 80 includes a web server application that allows the technician to configure and control operation of the controller 80 and other components of the system 10-1. The web server application executes on the processor, and the controller 80 and the external computer system connect to and communicate over a wired or wireless network. This enables the technician to interact with and configure operation of the controller 80 via an application ("app") executing on the external computer system.

The parameter files 82 can specify or change operation of one or more components of the system 10-1 prior to each execution "run" of the system 10-1. Each execution run forms a deep drawn helmet preform from a prepreg stack. The final helmet may be comprised of one or more deep drawn helmet preforms, in one example.

The controller 80 is in communication with and controls the ram cylinder 90-1 and the base cylinders 90-2. In one example, the controller 80 sends instructions and/or signals to advance each of the ram cylinder 90-1 and the base cylinders 90-2 towards each other or away from each other. The movement of each of the cylinders also advances each of the upper plate 115 and attached forming draw ring 20, and the center plate 110 and the non-forming draw ring 40 towards or away from each other. In an example operating mode, each of the non-forming draw ring 40 and the forming draw ring 20 are moved away from each other to a start position shown in FIG. 1.

More detail for the draw rings 20, 40 is as follows. The contact surface 24 of the forming draw ring 20 comes into contact with a top surface or layer of the prepreg stack 30.

The contact surface 44 of the non-forming forming draw ring 40 comes into contact with a bottom surface or layer of the prepreg stack 30. The non-forming draw ring 40 also has an aperture (not visible) through which the punch 50 travels/extends. Because this aperture typically does not contribute to the overall shape of the deep draw helmet formed from the prepreg stack 30, the aperture is referred to as a non-forming aperture.

The punch 50 includes a rigid body formed with an external surface. The rigid body of the punch 50 is disposed along the punch longitudinal axis 17. The external surface of the punch 50 is shaped to correspond with a desired internal shape of the inner surface of the helmet preform to be fabricated. In the illustrated example, the external surface is dome-shaped and has a crown 56 through which the punch longitudinal axis 17 passes.

In the illustrated example, the helmet forming system 10-1 is shown in a start position. In the start position, the center plate 110 is positioned just above the punch crown 56. The upper plate 115 and forming draw ring 20 are positioned separate from the non-forming draw ring 40 with enough space provided between the contact surfaces 24 and 44 of the forming draw ring and the non-forming draw ring to allow the technician to install a prepreg stack 30 onto the surface 44 and to align the prepreg stack 30 with alignment features described below.

After the prepreg stack 30 is loaded into a start position, the ram cylinder 90-1 advances the upper plate 115 and attached forming draw ring 20 toward the prepreg stack 30 until the prepreg stack 30 is clamped between the draw rings 20, 40. The result of this operation forms a clamped assembly 62 that includes the forming draw ring 20, the prepreg stack 30 and the non-forming draw ring 40.

When the clamped assembly 62 is established, one or both of the upper plate 115 and the center plate 110 is/are advanced toward the other until a preselected clamping force is applied to the prepreg stack 30. The controller 80 can then send instructions and/or signals to each of the ram cylinder 90-1 and the base cylinders 90-2 to advance the clamped assembly as a unit towards the punch 50. Here, the punch 50 is fixed in position.

It can also be appreciated that other positions of the punch 50 relative to the prepreg stack 30 can be employed for the start position of the forming system 10-1. In one example, the crown 56 of the punch 50 might extend slightly upwards through the non-forming aperture of the non-forming draw ring 40. Here, the crown 56 of the punch 50 is also disposed against the bottom-most layer of the prepreg stack 30. This position of the punch 50 is illustrated in FIG. 5A, the description of which is included herein below.

The temperature control system 70 provides heating and/or cooling to various components of the system 10-1 and can independently control the temperature of each component to which the temperature control system 70 connects. In one example, the temperature control system 70 can heat and cool the punch 50, e.g., by heating elements and a water circuit, respectively. In another example, the temperature control system 70 connects to and heats and/or cools the forming draw ring 20 and/or the non-forming draw ring 40, e.g., by a water or steam circuit or using electrical heating elements.

The controller is also in communication with the temperature control system 70. In one example, the controller 80 can instruct the temperature control system 70 to independently modify a temperature of one or both of the forming draw ring 20 and the non-forming draw ring 40 as required to modify or maintain the temperature of the prepreg stack 30. The controller 80 can also activate the temperature control system 70 to modify a temperature of an external surface of the punch 50 during operation of the system 10-1.

In various operating modes, the temperature control system 70 is operable to alter the temperature of the prepreg stack or to maintain the temperature of the prepreg stack 30 at a desired forming temperature. Similarly, the temperature control system 70 is operable to alter the temperature of the punch 50, or to alter or maintain the temperature of the punch at a desired forming temperature. In other modes, the temperature control system 70 is operable to alter the temperature of the prepreg stack to create a temperature gradient between different regions or areas of the prepreg stack 30 during helmet forming.

In an exemplary embodiment, the temperature control system 70 includes one or more temperature sensors. The temperature sensors are configured to sample the temperature of the prepreg stack 30, the rings 20, 40 or the punch 50 in key locations and to submit temperature signals corresponding with each location to the controller 80. In an exemplary embodiment, the temperature control system 70 may comprise a system for circulating heated water, steam, or cooled water through fluid conduits formed inside the draw rings 20, 40 or circulating heated water, steam, or cooled water through fluid conduits formed inside the punch 50. These fluid conduits can modify surface temperatures of the draw rings 20, 40 or of the punch 50 as required to maintain a predetermined surface temperature of one or more surfaces during helmet forming cycles.

The punch 50 as well as the forming and non-forming draw rings 20, 40 are configured to form a helmet preform of a particular helmet size and/or shape. These components are configured differently to correspond with different sized helmets such as extra-large, large, medium or small helmets, in examples. Accordingly, at least the punch 50 and the forming draw ring 20 are changed or modified in order to form helmet preforms corresponding with different helmet sizes.

The helmet forming system 10-1 can be utilized to create deep drawn helmets with different ballistic and non-ballistic characteristics. Helmets with ballistic characteristics are designed to protect the wearer against projectiles such as bullets and shrapnel. The ballistic helmets are typically used in military combat situations and police riot control, in examples. In contrast, helmets with non-ballistic characteristics are designed to protect against shock, compression and blunt impact. The non-ballistic helmets are generally lighter in weight and are often used in military and police training, and in environments where durability is a chief concern.

It can also be appreciated that the helmet forming system 10-1 can be configured in different ways. In an inverted configuration, for example, the components of the system might be inverted 180 degrees. Here, the punch 50 would be mounted above and facing downward towards the non-forming draw ring 40, while the ram system 60 would be located near the bottom of the page and be below the level of the forming draw ring 20.

In yet another implementation, the punch 50 could be configured to travel along the punch longitudinal axis 17 rather than being stationary. In yet another example, the cushion 125 that actuates the base cylinders 90-2 can be located either above or below the base plate 105. In still another implementation, the entirety of the system 10 might be arranged to be substantially parallel to a plane of the ground. In such an arrangement, the axis 17 is now a latitudinal axis.

Figure 2A:
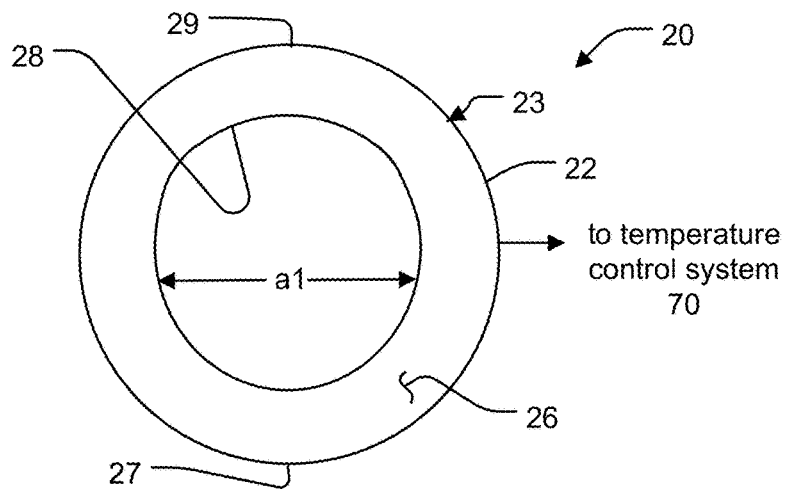
FIGS. 2A and 2B are top views of a forming draw ring and a non-forming draw ring in the helmet forming system of FIG. 1, respectively.

FIG. 2A is a top view of the forming draw ring 20, according to one implementation. The forming draw ring 20 has a rigid body 22, a front side 27 and a back side 29, an inner perimeter surface 28 and an outside perimeter 23. The inner parameter surface 28 defines a forming aperture a1.

More detail for the inner perimeter surface 28 and the forming aperture a1 is as follows.

The inner perimeter surface 28 extends between the contact surface and the non-contact surface 26. The forming aperture a1 is defined by the inner perimeter surface 28 and passes through the rigid body 22. As will be described below, a center axis of the forming aperture a1 is aligned with the punch longitudinal axis 17.

The rigid body 22 is designed so that its forming aperture a1 has a specific shape.

Specifically, the forming aperture a1 is configured to define a shape of an outside surface of the helmet preforms to be formed by the system 10-1.

The forming draw ring 20 is preferably made from thermally conductive materials to increase thermal energy transfer rates by thermal conduction for more uniform and rapid heating and cooling by the temperature control system 70. Typically, the forming ring 20 is made from tool steel, stainless steel, aluminum alloys or a metal alloy that is rigid and conducts heat well.

In one implementation, the forming draw ring 20 is fabricated to include multiple "zones" that can each be independently heated or cooled. For this purpose, each heating zone is formed from a thermally conductive material and is thermally isolated from each of the other zones. In one example, ceramic or plastic separators are included as boundaries between hot and cold zones. The separators are disposed to disrupt thermally conductive pathways provided by the thermally conductive material forming each zone. These thermally isolating separators enable the thermal isolation of each zone while also providing the structural rigidity required by the forming draw ring 20.

When the forming draw ring 20 includes different independently heated zones, each zone is preferably sized and heated in accordance with different locations of the helmet preform to be fabricated. For this reason, the zones might all have the same size or have different sizes.

Because the external surface of the punch 50 is designed to be the same shape as the inner portion of the helmet preform to be fabricated, the zones are designed to correspond with associated locations or areas on the external surface of the punch 50 or with selected areas of the forming aperture a1.

Figure 2B:
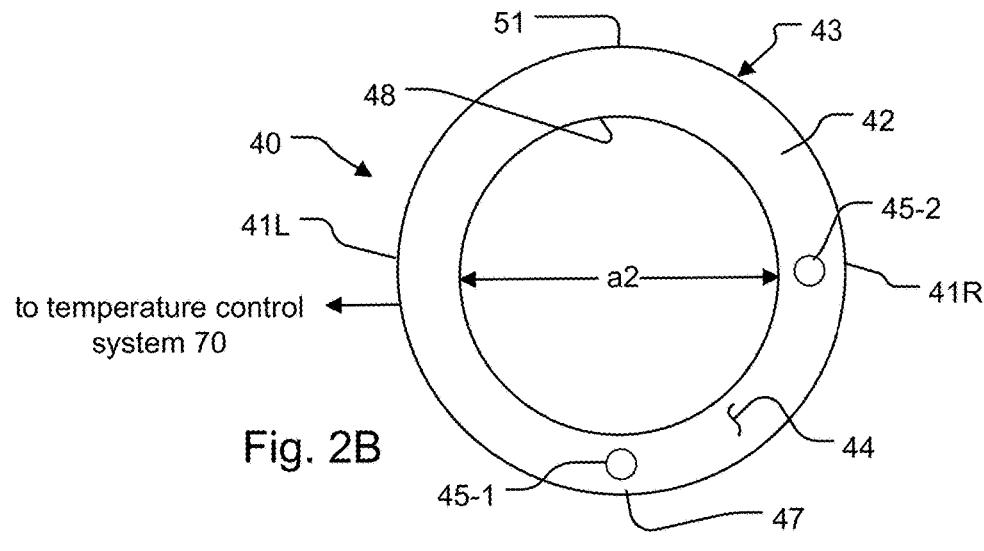

FIG. 2B is a top view of the non-forming draw ring 40, according to one implementation. The non-forming draw ring 40 has a rigid body 42, a front side 47, a right side 41R and a left side 41L and a back side 51. The rigid body 42 is bounded by a non-contact surface (not shown), a contact surface 44 opposed to the non-contact surface, an inner perimeter surface 48 that defines a non-forming aperture a2, and an outer perimeter surface 43. As will be described below, a center axis of the non-forming aperture a2 is aligned with the punch longitudinal axis 17.

The rigid body 42 also includes one or more alignment features 45. The alignment features 45 extend from, are formed by, or otherwise are indicated by one or more features on the contact surface 44, the outer perimeter surface 43, or the like. Two alignment features 45 are shown. A first alignment feature 45-1 is located at the front side 47 and a second alignment feature 45-2 is located at the right side 41R.

The alignment features 45 enable precise alignment of the prepreg stack 30 in a loading position. The loading position aligns features of the prepreg stack 30 with respect to the alignment features 45 of the non-forming draw ring 40. The alignment features of the prepreg stack can include one or more peripheral edges of the prepreg stack 30.

Additionally, the alignment features 45 are positioned to co-align a central axis of the prepreg stack with the punch longitudinal axis 17. In one example, the alignment features 45 are markings such as lines etched or otherwise formed upon the contact surface 44. In another example, as shown, the marking features are structures such as metal pins that extend vertically upward from the contact surface 44. In still another example, the marking features might be provided by a recessed mounting pocket formed by the non-forming draw ring 40 or other alignment features extending from its outer perimeter surface 43.

More detail for the inner perimeter surface 48 and the non-forming aperture a2 is as follows. The inner perimeter surface 48 extends between the contact surface 44 and the non-contact surface 46. The non-forming aperture a2 is defined by the inner perimeter surface 48, which passes through the rigid body 42 and is centered with respect to the punch longitudinal axis 17.

Unlike the forming aperture a1, the shape of the non-forming aperture a2 need not be as conformal as aperture a1 to the shape of the helmet preform to be fabricated/formed. Non-forming ring 40 exerts a clamping force to oppose that of the forming draw ring 20. The non-forming aperture a2 is preferably designed to be slightly larger than a perimeter of the external surface of the punch 50. The contact surface 44 is designed to contribute to the friction force placed upon the flange 12 of the prepreg stack 30 during formation of the helmet preform.

Each of the forming and non-forming draw rings 20, 40 is formed from a thermally conductive material such as a metal alloy, e.g., tool steel, stainless steel, an aluminum alloy or other metal alloys. The contact surfaces 24, 44 of each draw ring 20, 40 that come into contact with surfaces of the prepreg stack 30 during drawing have a specific finish (e.g., surface roughness and applied coating) and geometry (e.g., flatness or profiled contour) to control the flow of material over the punch during forming. Preferably, all surfaces of the draw rings are protected from oxidation and wear by applying a surface coating thereon. The surface coating may comprise electroplated nickel, or the like, or a material that is compatible with electroplating or anodizing or is otherwise passivated to prevent oxidation.

Figure 2C:
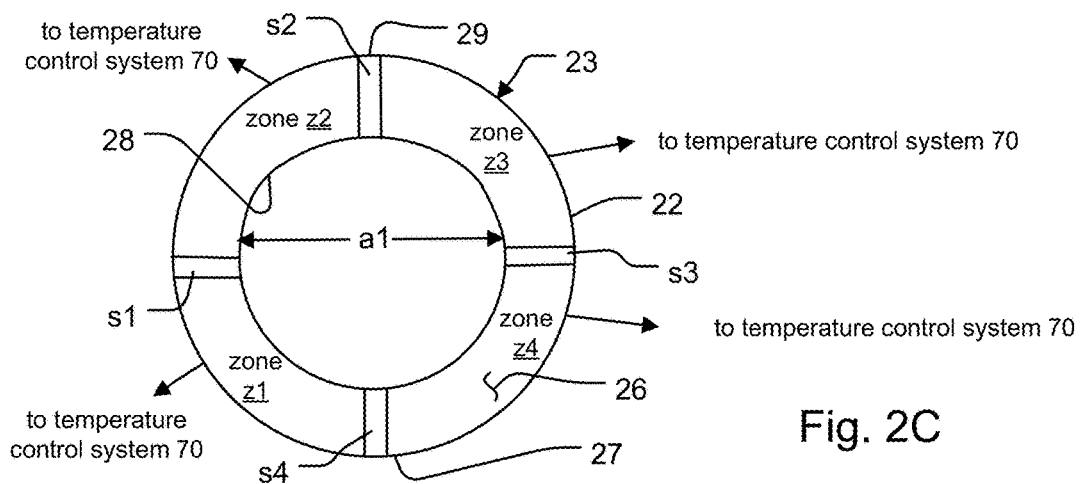
FIG. 2C is a top view of a another forming draw ring with separate zones that can be heated and cooled independently.

FIG. 2C shows another embodiment of a forming draw ring 20. In the illustrated example, the ring 20 has four separate zones z1 through z4 that separately connect to and can be heated and cooled independently by the temperature control system 70. The zones z1 through z4 are set apart from one another via separators s1 through s4. In this embodiment, the zones z1, z2, z3 and z4 are respectfully configured to enable independent heating and cooling of a front left portion, a back left portion, a back right portion, and a front right portion of the forming draw ring 20. This enables independent temperature control of corresponding portions of the helmet preform to be created. In other examples, as few as two zones can be supported, or as many as eight zones, or possibly even more.

It can be appreciated that either of the draw rings 20, 40 or both rings can be designed to support different temperature control zones z, and the temperature control system 70 separately connects to and is correspondingly configured for these temperature control zones z. When the draw ring(s)

support these different temperature control zones z, the surface temperature of each draw ring can be configured to be non-uniform over its rigid body 22, 42.

In one example, the first temperature zone z1 can be maintained at a higher temperature than the second zone z2 or subsequent zones. In another example, the forming draw ring 20 might be configured to include separate zones for a left earcup and a right earcup of the helmet preform to be created, and smaller front and back portions of the helmet preform to be created as compared to those defined by z1 and z2 as shown. In this example, the zones associated with the earcups might be heated to a higher temperature than that applied to the front and back zones to promote increased material flow of the prepreg stack 30 at the earcups during formation of the helmet preform.

By increasing or decreasing the temperature for a selected zone z of the rings 20, 40 relative to the others and/or relative to the external surface 54 of the punch 50, the formability of the prepreg stack 30 at locations adjacent to the selected zone and/or punch external surface 54 can be altered. The temperatures for each zone is typically chosen in accordance with the physical properties of the resin matrix of the prepreg stack 30 that controls its fiber reorientation.

In conjunction with zone-specific temperature adjustment, the technician can also modify a friction coefficient at either or both of the contact surfaces 22, 44. In this way, the shape of the helmet preform 76 may be adjusted during drawing at one or more locations but not others. More detail regarding the adjustment of a friction coefficient at either or both of the contact surfaces 22, 44 can be found in the description associated with FIG. 6, included herein below.

In one implementation, each temperature control zone z within a draw ring has a separate, independent fluid conduit. The fluid conduit corresponding to each zone is independently controlled by the temperature control system 70. The fluid conduits might be integrated within the portion of the ring that comprises each zone z, or be placed upon the portion of the ring for each zone z, in examples. For this purpose, each independent fluid conduit might receive a water or steam flow from a separate water or steam source. In one example, there are two or more water or steam sources that are independently operable to deliver a water or steam flow at a selected temperature, which may be the same temperature or at least two different temperatures.

In one example, a first conduit of a plurality of fluid conduits receives a water or steam flow from a first water or steam flow source, and a second conduit receives a water or steam flow from a second water or steam flow source. Here, the first fluid conduit might be disposed in regions/zones z of the corresponding rings at locations where a first ring temperature is maintained, while the second fluid conduit is disposed in regions/zones of the corresponding rings at locations where a second ring temperature is maintained. The rings may be configured with one or more thermal insulation barriers, e.g., ceramic separators s, installed to thermally isolate the temperature control zones z from one another.

Typically, the temperature control system 70 configures the temperatures for each of the zones of the draw rings 20, 40 at the starting point of the system 10, and maintains the temperatures at each of zones throughout the drawing process. The temperatures for each of the zones are specified within the parameter files 82 loaded by the controller 80.

Additionally and/or alternatively, the temperature control system 70 might configure different temperatures for one or more of the zones z of the draw rings 20, 40 at different times during the drawing process. Such a capability can "fine tune" the forming process of the helmet preform during the drawing. In examples, the temperatures of the one or more zones z might be adjusted during drawing as a function of the drawing depth, in response to changes in ambient temperature around the system 10, and to make adjustments at specific times to one or more areas or portions of the prepreg stack 30 that come into contact with their respective zones, or the like. For this purpose, the parameter files 82 include a time component as well as a temperature setting/range of temperatures setting for each of the zones z.

Figure 3A:
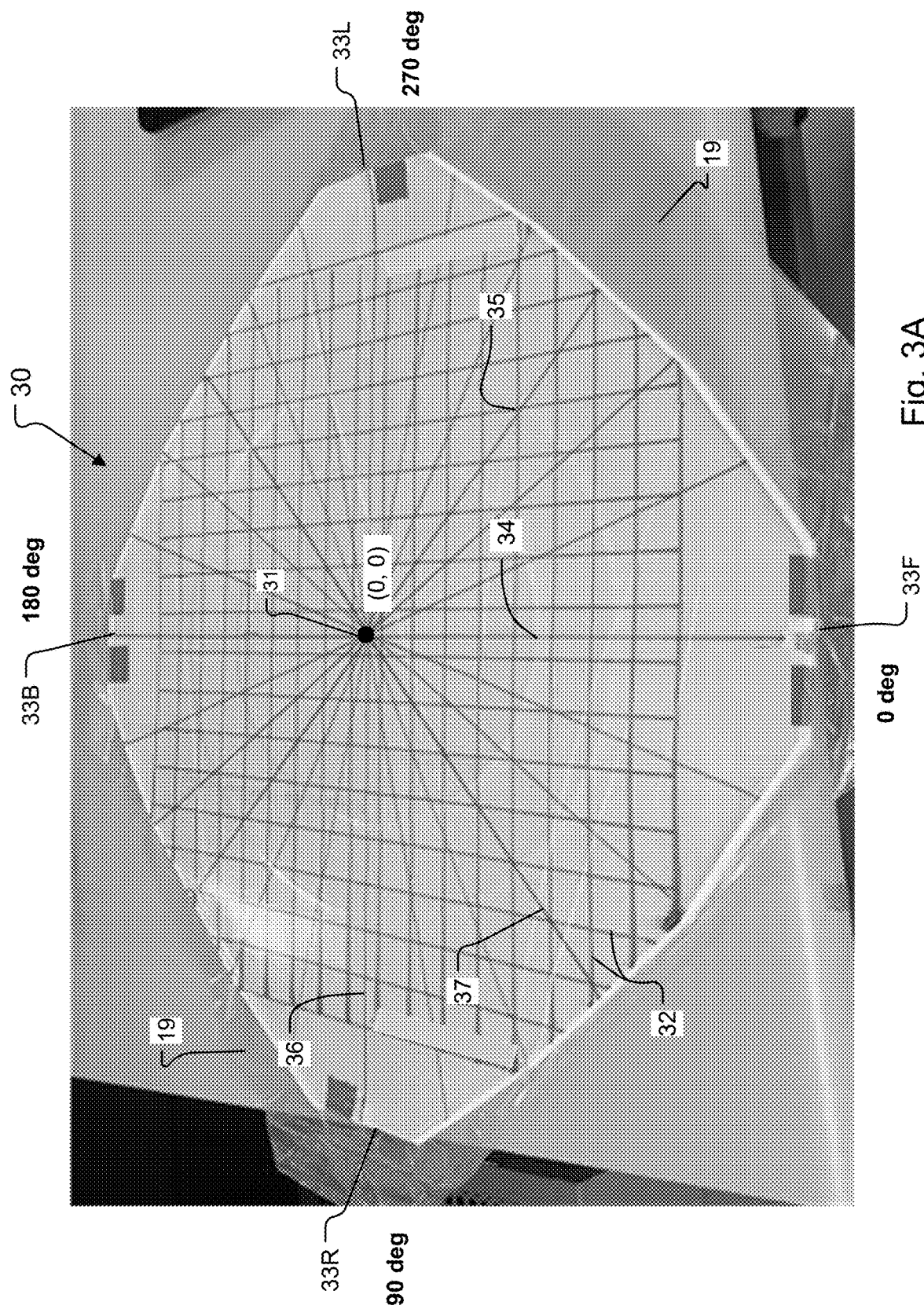
FIG. 3A is a perspective view of an exemplary prepreg stack that is enclosed in a sealed vacuum bag, where a marked grid superimposed upon a top layer of the prepreg stack is shown, and where the vacuum bag enables the helmet forming system to create a helmet preform from the prepreg stack under vacuum.

FIG. 3A shows an exemplary prepreg stack 30. The prepreg stack 30 is shown encased or otherwise enclosed in a transparent vacuum bag 19. The prepreg stack 30 includes multiple sheets or "plies" of oriented material stacked on top of one another, and has sides including a front 33F, back 33B, left 33L and a right side 33R. Each ply, in turn, typically includes one or more layers of oriented material. Only a top ply of the prepreg stack 30 is visible in the figure.

A marked grid 32 that is superimposed upon the topmost ply of the prepreg stack 30 is also shown. The marked grid 32 is used during development, testing and prototyping of the helmet forming system 10-1 and is not required to be applied to the prepreg stack 30 during production runs.

The prepreg stack 30 is a grouping of materials arranged in one or more sheets/plies. The plies include materials that can be oriented in different ways to achieve a desired formability, strength and/or various ballistics properties in the resulting helmet. For this reason, these materials are known more generally as oriented materials. In examples, these oriented materials include or are otherwise formed from cross-plied unidirectional fiber assemblies, woven or nonwoven fabric, tape-based materials, or combinations thereof. Fibers are the most typical type of oriented materials used in plies and are thus emphasized in the remaining disclosure, included herein below.

The fibers in each layer of each cross-ply material are typically arranged in a fixed pattern, with long, continuous strands of the fibers arranged side-by-side. Two or more unidirectional plies as a unit are then stacked on top of one another, typically perpendicular to one another.

Each ply of material includes loosely coupled, woven or non-woven fibers that are typically pre-impregnated with resin (thermoset or thermoplastic). The term "thermoplastic" describes polymer resins which can be heated and molded, and then reheated and cooled as required. However, the plies can also be incorporated without resin, also known as a dry reinforcement. Thermoset resins strengthen when initially heated, but cannot be remolded after initial forming. Thermoplastic resins can be heated and molded and then reheated, remolded and cooled as required. For dry reinforcement, separate resin layers can be added during the assembly of the prepreg stack 30.

In one implementation, the plies may include orthotropic cross-ply materials such as ultra high molecular weight polyethylene (UHMWPE) fiber or tape-based prepreg, resin films, and/or prepreg woven or nonwoven fabrics containing thermoplastic and/or thermoset resin. In another implementation, these fabrics can be incorporated dry with the addition of resin separately typically in the forms of film or mesh. The resin may be included to improve adhesion of these elements to the prepreg stack, to provide a resin-rich substrate for manufacturability and cosmetics, or for promoting pressure uniformity during consolidation. Additional films can be incorporated in the form of one or more layers placed at the exterior of the prepreg stack, such as a sacrificial barrier film or a plastic vacuum bag that surrounds and encapsulates the prepreg stack, in examples.

It is important to note that the prepreg stack 30 has no cuts such as dart cuts or slits in its plies. Rather, the individual plies are cut in a specific set of patterns whose shape and size depend on the orientation of the material relative to a coordinate system of the punch/punch coordinate system, the geometric features of the punch 50 and its external surface 54, and the desired ballistic and structural performance of the resulting consolidated helmet. The patterns are developed in conjunction with the forming method and materials such that they minimize forming defects (wrinkles) and promote uniformity (thickness), while maintaining long fibers to enhance ballistic performance.

The prepreg stack 30 has a marked grid 32 that a technician uses for reference during operation of the system 10. The marked grid 32 mimics and is designed to align with the punch coordinate system. In this way, a specific orientation of the prepreg stack 30 is aligned relative to a punch coordinate axis prior to the forming of the deep drawn helmet preform.

The grid 32 may be removed in production runs once other alignment features 45 have been incorporated into the non-forming draw ring 40. The grid 32 has an origin 31 and various lines that cross through the origin in different directions. These directions are defined relative to the center front side 33F of the prepreg stack 30 and are used to describe axes along which the fibers are to be aligned/oriented during assembly of the prepreg stack.

During the development phase, the technician uses the marked grid 32 for tracking the prepreg stack's material deformation during the forming process of the helmet preform, as a function of the ply pattern design, fiber orientation, material properties, and processing parameters defined in the parameter file 82.

In examples, these directions may include fiber aligned with the 0-degree direction 34, or with the −45-degree direction 37, as well as other increments to achieve the level of quasi-isotropic performance desired.

The fiber directions are pre-selected to create helmet preforms from the prepreg stack 30 with specific characteristics. In one example, a technician of the system 10-1 selects an associated prepreg stack 30 geometry, and then loads the prepreg stack 30 into the system 10-1 by aligning the front 33F and the right side 33R of the prepreg stack with the alignment features 45-1 and 45-2 of the non-forming draw ring 40, respectively. In this way, the front 33F of the prepreg stack 30 is aligned with the front side 47 of the non-forming draw ring 40.

The technician can then define operational parameters tailored to the predetermined prepreg stack configuration and geometry of the desired helmet preform such that they maximize the strength of the resulting helmet by reducing forming defects (wrinkles) and promoting uniformity.

Before executing a "run" of the system, the technician employs a means for enclosing and sealing the prepreg stack 30 under vacuum prior to drawing. This keeps the prepreg stack 30 free from debris and contamination prior to drawing. Preferably, this means is a vacuum bag 19 that includes the prepreg stack 30. In another example, the means is an airtight seal that is placed around the clamped assembly 62, and the technician evacuates the airtight seal prior to drawing.

When the vacuum bag is the means for enclosing and sealing the prepreg stack 30 under vacuum, the technician either places the prepreg stack in the vacuum bag 19, then evacuates air from the bag, and seals the bag 19. The technician then loads the vacuum bag 19 including the prepreg stack 30 onto the contact surface 44 of the non-forming draw ring 40. The technician can reference the alignment features 45-1 and 45-2 relative to the indices or the marked grid 32 on the prepreg stack 30 to properly orient the front 47 of the non-forming draw ring 40 to the prepreg stack 30.

Use of the vacuum bag 19 has multiple benefits. In one example, the vacuum bag keeps the prepreg stack 30 clean and free of contaminants. This is important in industrial environments and research and development environments that are developing other products in the same facility. In another example, the prepreg stacks 30 often include trapped air between the layers, and sometimes between the individual fibers. By evacuating the bag 19 and forming the helmet preform while the prepreg stack is under vacuum, the presence of trapped air and subsequent bubbles in the helmet preforms are significantly eliminated.

FIG. 3B shows an exemplary single UHMWPE ply 39 within a prepreg stack 30. Here, the prepreg stack 30 is assembled from/includes only a single ply 39 for illustration purposes. However, the prepreg stack 30 typically includes multiple plies 39 that are placed on top of one another. The materials of the plies include unidirectional fibrous materials, woven and nonwoven fabrics, felts, and tapes.

In the illustrated example, the single ply 39 has four unidirectional fiber-reinforced layers of prepreg material. These layers include a bottom layer 16-1, two middle layers 16-2, 16-3 and a top layer 16-4. Each layer 16 includes fibers 18 that are arranged along a fiber axis 101 of each layer. Fiber axes 101-1 through 101-4 for each of the layers 16-1 through 16-4 are shown.

The fibers 18 in each layer 16 of each ply 39 are preferably unidirectional. Within each layer 16, the fibers 18 are arranged to be adjacent to one another, run substantially parallel to its fiber axis 101, and extend the entire length of each layer 16. In examples, the fibers 18 can be made of materials with ballistic protection capabilities including para-aramid materials and/or thermoplastic polyethylene materials such as ultra-high molecular weight polyethylene (UHMWPE). In other embodiments these may be incorporated as woven materials. The layers 16 might also include fibers and tape based materials used in body armor materials. These fibers may be formed from materials including carbon-, glass-, polypropylene-, p-phenylene-2,6-benzobisoxazole ("PBO")-fibers, and possibly other materials.

Generally, within each ply 39, the fiber axes 101 of the fibers 18 in each layer 16 are pre-oriented with respect to one another to achieve a specific design goal. In the illustrated example, the layers 16 are cross-plied. Here, the fiber axis 101 of one layer 16 is substantially perpendicular to that of each layer below and above it. The inner portion 14 and outer portion/flange 12 of the prepreg stack 30 are indicated on the top layer 16-4.

Thermoplastic resin is included between each layer 16. The resin is typically mildly preheated at the factory to allow the layers to be loosely coupled together and not shift their orientations during shipment and before use.

While only four layers 16 of a single ply 39 are shown, fewer or additional layers within each ply 39 are also possible. The multiple plies 39 are then stacked on top of one another to assemble the prepreg stack 30. Often, prepreg stacks 30 can include as few as 5 to 10 plies or possibly dozens of plies 39, in examples.

When multiple plies 39 are stacked to form the prepreg stack 30, each ply 39 as a unit is also typically cross-plied with respect to each adjacent ply in the stack 30. For example, when a first ply is placed on top of a second ply, the bottom layer 16-1 of the first ply is arranged such that its fiber axis 101-1 is substantially orthogonal to the fiber axis 101-4 of the top layer 16-4 of the second ply. Such an arrangement of the plies 39 in the stack 30 promotes strength and balances the properties of the stack.

FIG. 3C shows idealized detail for the fibers 18 in the top layer 16-4 of the prepreg stack 30/single ply 39 within the prepreg stack 30 shown in FIG. 3B. Each fiber 18 is aligned substantially parallel to its fiber axis 101-4, has a substantially uniform diameter d1 and is designed to have minimal gaps between adjacent fibers.

FIG. 4 is a flow chart that illustrates a method of operation of the helmet forming system 10-1 for creating a helmet from a prepreg stack. In this method, the system 10-1 first forms a deep drawn helmet preform and then creates a final helmet from the helmet preform via a consolidation process. The helmet preform produced as a result of this method can include one or more such intermediate helmet preforms assembled prior to consolidation. The method begins in step 402.

In step 402, the system 10-1 supports the prepreg stack 30 between the forming aperture a1 of the forming draw ring 20 and the non-forming aperture a2 of the non-forming draw ring 40. Preferably, the prepreg stack 30 is placed in the vacuum bag 19, the bag 19 is evacuated, the prepreg stack 30 is preheated until its center reaches a target temperature, and the technician loads the preheated prepreg stack 30 and bag 19 onto the contact surface 44 of the non-forming draw ring 40 at the beginning of this step. During the loading, the technician places the prepreg stack 30 in a start position, where the position and orientation of the prepreg stack 30 relative to the external surface of the punch 50 is guided via the one or more of the alignment features 45.

According to step 404, the system 10-1 clamps a second portion of the prepreg stack 30 (i.e., the flange portion 12) between the contact surface 24 of the forming draw ring 20 and the contact surface 44 of the non-forming draw ring 40, the result of which forms a clamped assembly 62 of the forming draw ring 20, the prepreg stack 30, and the non-forming draw ring 40. In more detail, the controller 80 directs the ram cylinder 90-1 to advance the forming draw ring 20 towards the non-forming draw ring 40, and also directs the base cylinders 90-2 to advance the non-forming draw ring 40 towards the forming ring. The result of this operation forms the clamped assembly 62.

In step 406, the system 10-1 forms a deep drawn helmet preform from the prepreg stack 30 of the clamped assembly. For this purpose, the system 10-1 advances the prepreg stack 30 relative to the punch 50.

In more detail, the controller 80 directs advancement of the prepreg stack 30 relative to the punch 50 to form the deep drawn helmet preform 76, during which the system 10-1 applies a clamping force to the clamped assembly 62, and during which the punch 50 enters and passes through the non-forming aperture a2 and then draws the inner portion 14 of the prepreg stack 30 through the forming aperture a1 until a desired drawing depth of the prepreg stack 30 is achieved.

As previously noted in the description associated with FIG. 1, included herein above, there are different ways that the controller 80 can direct advancement of the prepreg stack 30 relative to the punch 50 to form the deep drawn helmet preform 76. In one example, the punch 50 is stationary, and the controller 80 directs the ram cylinder 90-1 and the base cylinder(s) 90-2 to move the clamped assembly 62 towards the external surface 54 and crown 56 of the punch 50 until the desired drawing depth of the helmet preform 76 is achieved. In another example, the clamped assembly 62 is stationary, and the controller 80 directs actuators of the punch 50 to move the punch 50 towards the prepreg stack 30 until the desired drawing depth of the helmet preform 76 is achieved. In each example, the external surface 54 and crown 56 of the punch 50 are urged against the inside portion 14 of the prepreg stack 30.

Then, in step 408, the helmet forming system 10-1 (or a separate helmet forming system) creates a final deep drawn helmet from one or more deep drawn helmet preforms via a consolidation process.

More detail for steps 402 through 406 are provided in the descriptions of FIG. 5A through FIG. 11, which are included herein below. More detail for step 408 is provided in the descriptions of FIGS. 12A and 12B, which are also included herein below.

FIG. 5A-5D show more detail for the helmet forming system 10-1 in FIG. 1. These figures also show different embodiments of the forming draw ring 20 and illustrate typical operation of the system 10-1.

FIG. 5A shows an initial state of the helmet forming system 10-1 and an embodiment of the forming draw ring 20. The technician loads the prepreg stack 30 enclosed in the vacuum bag 19 between the forming draw ring 20 and the non-forming draw ring 40 such that the bottom layer 16-1 of the bottom-most ply 39 of the prepreg stack 30 faces and is in contact with the contact surface 44 of the non-forming draw ring 40.

The non-forming draw ring 40 has a ring height h2 and the forming draw ring 20 has a ring height h1. These ring heights h1, h2 may be equal or different. The forming aperture a1 of the forming draw ring 20 and the non-forming aperture a2 of the non-forming draw ring are aligned with respect to the punch longitudinal axis 17. Preferably, each ring height is selected to provide a substantially nondeformable ring structure e.g., to prevent bending or other deformation, especially surrounding the forming aperture a1.

An embodiment of the forming draw ring 20 is also shown. The inner perimeter surface 28 of the forming draw ring 20 defines aperture a1 and has a curved shape. The inner perimeter surface 28 is widest at the contact surface 24 and curves inward and upward to the non-contact surface 26/height h1. The curved shape is configured to guide the prepreg stack 30 as it is forced over the punch external surface 54 and drawn. In this embodiment, the inner perimeter surface 28 is wider at the contact surface than at the non-contact surface 26/height h1. In examples, the forming aperture a1 of the forming draw ring 20 may be substantially cylindrical with a rounded bottom edge, or it may be somewhat wider at its contact surface 24 than at its non-contact surface 26 of the ring 20. In yet another example, the aperture a1 might be intentionally profiled to be widest at its contact surface 24 and be increasingly narrower along its entire height h1, similar to that shown in FIG. 6.

The punch 50 has a punch riser 52 disposed along the punch longitudinal axis 17. The punch 50 has an external surface 54 with a crown 56. The crown is located at the top of the punch external surface 54. The crown 56 is aligned with respect to the punch longitudinal axis 17. The punch external surface 54 is formed to shape an inner portion, e.g., the inner surface of a helmet preform being formed by the helmet forming system 10-1. The punch 50 may be formed from tool steel, stainless steel, aluminum, or other metal alloys. The external shape of the punch 50 is preferably formed as a substantially nondeformable structure. The external surface 54 is preferably polished and protected from oxidation and wear, e.g., by an electroplated nickel layer, or the like, by an anodized surface or by another surface passivation method.

The ram cylinder 90-1, e.g., a hydraulic cylinder assembly, a lead screw driven assembly, or the like, is attached to the ram assembly 60. The ram assembly 60 supports the upper plate 115. The upper plate 115 supports the forming draw ring 20 at its non-contact surface 26.

Movement of the upper plate 115 and the forming draw ring 20 is guided by the guide rail set 120 and is indicated by reference m1. The ram cylinder 90-1 moves under control of the controller 80, e.g., by pressurizing a hydraulic fluid, or rotating a lead screw, to advance the ram cylinder the upper plate 115 and the forming draw ring 20 along a motion axis defined by the guide rail set 120. Preferably, the motion axis of the forming draw ring 20 is parallel with the punch longitudinal axis 17 and the ram cylinder is movable toward or away from the punch 50 over a motion range.

In a similar vein, the base cylinders 90-2, e.g., a hydraulic cylinder assembly, a lead screw driven assembly, or the like, extend from the cushion 125 and attach to the center plate 110. In the embodiment shown, the cushion 125 rests on the base plate 105. However, the base plate 105 might alternatively be located above the cushion 125, provided that relief holes are incorporated for passage of the base cylinders 90-2. The center plate 110 supports the non-forming draw ring 40 at its non-contact surface 46.

Movement of the center plate 110 and the non-forming draw ring 40 is guided by the guide rail set 120 and is indicated by reference m2. The base cylinders 90-2 move under control of the controller 80, e.g., by pressurizing a hydraulic fluid, or rotating a lead screw, to advance the upper plate 115 along a motion axis defined by the guide rails 120. Preferably, the motion axis of the forming draw ring 20 is parallel with the punch longitudinal axis 17 and the base cylinders 90-2 are movable toward or away from the punch 50 over a motion range.

The controller 80 can control and restrict the movement of the ram cylinders 90-1 and/or 90-2, with respect to the motion axis to act in synchronization or independently. Because the cylinders 90-1, 90-2 are each mechanically interfaced with a different one of the draw rings 20, 40, independent movement of each draw ring toward or away from the punch along a common longitudinal axis is provided. Similarly, one or both of the cylinders 90-1, 90-2 can be stopped at a desired position to thereby position each draw ring 20, 40 at a position along the punch longitudinal axis 17 over the range of motions.

The components of the system 10-1 are arranged as follows. As with the punch 50, the ram system 60, the forming draw ring 20, the non-forming draw ring 40, and the prepreg stack 30 are centrally aligned with respect to the punch longitudinal axis 17. The ram system 60 and the ram cylinder 90-1 face the non-contact surface 26 of the forming draw ring 20. The contact surface 24 of the forming draw ring 20 faces the top layer 16-4 of the prepreg stack 30. The contact surface 44 of the non-forming draw ring 40 faces the bottom layer 16-1 of the prepreg stack 30. The base cylinders 90-2 and the punch crown 56 face the non-contact surface 46 of the non-forming draw ring 40. In the embodiment shown, the punch 50 is supported by the portable cushion 125 and the base plate 105, for example.

The punch external surface 54 passes through each of the non-forming aperture a2 and the forming aperture a1 with clearance over the motion range of base cylinders 90-2 and the ram cylinder 90-1. Prior to the technician loading the prepreg stack 30 onto the contact surface 44 of the non-forming draw ring 40, the technician typically pre-heats the prepreg stack 30. Typically, the prepreg stack 30 is heated in an oven until a predefined core temperature is reached. In one example, the prepreg stack is heated to a temperature between 150 and 275 degrees Fahrenheit (F) before loading. However, the prepreg stack 30 can be formed as a helmet preform over a stack core temperature ranging between ambient and the temperature of degradation of mechanical properties of the fibers without deviating from the invention. In one example, for UHMWPE, the maximum forming temperature before degradation occurs is about 310 degrees Fahrenheit (F) or possibly higher.

After the technician pre-heats and loads the prepreg stack 30, the technician aligns the front 33F of the prepreg stack with the front 47 of the non-forming draw ring 40 with the assistance of the first alignment feature 45-1 of the non-forming draw ring, as shown in FIG. 3A. In this way, the technician aligns one of the indices on the prepreg stack 30 to achieve the desired orientation and position with respect to the punch coordinate system, with the aid of the alignment features 45-1, 45-2, shown in FIG. 2B.

In the start position shown in FIG. 5A, the forming draw ring 20 is separated from the non-forming draw ring 40. The prepreg inner portion 14 extends over the non-forming aperture a2 and the flange 12 surrounds the non-forming aperture a2. The forming draw ring 20 is held in its starting position by the ram cylinder 90-1 and the nonforming ring 40 is held in its starting position by the base cylinders 90-2. The starting positions are set and maintained by the controller 80, e.g., at the beginning of each helmet preforming cycle The technician then selects a parameter file 82 on the controller 80 that includes preconfigured operational parameters for the execution "run," and instructs the controller to execute the parameter file 82 to begin the execution run.

FIG. 5B-5D show operation of the helmet forming system 10-1 after the controller 80 executes the selected parameter file 82. In FIG. 5B-5D, a different embodiment of the forming draw ring 20 is shown than the ring 20 in FIG. 5A.

FIG. 5B depicts the clamped assembly 62, without showing the ram assembly 60, the base cylinders 90-2, the guide rail set 120 or the base, center, or upper plates. In the clamped assembly 62, the prepreg stack 30 is clamped between the non-forming ring 40 and the forming draw ring 20. The inner portion 14 of the prepreg stack 30 is disposed between the non-forming aperture a2 and the forming aperture a1, and the flange 12 is captured and clamped between the contact surfaces 24 and 44 of the forming draw ring 20 and the non-forming draw ring 40, respectively.

Another embodiment of the forming draw ring 20 is shown in the figure. In the illustrated example, inner perimeter surface 28 of the forming draw ring 20 is formed with a curved shape as in FIG. 5A. However, the inner perimeter surface 28 is wider at the contact surface 24 as compared to that in FIG. 5A and has a more inwardly curving profile. Here, the width of the inner perimeter surface 28 at the contact surface 24 is wider than at the non-contact surface 26.

Optional load cells 63 of the system 10-1 are also shown. The load cells 63 are disposed against the rings 20, 40 and can detect the clamping force applied to the prepreg stack 30 at the flange 12 of the prepreg stack 30. The load cells 63 each connect to and are in communication with the controller 80. The load cells may include one or more transducers positioned to detect a magnitude of the clamping force and to generate a clamping force signal in proportion to the sensed clamping force magnitude.

The clamping force signal is transmitted to the controller 80 and the controller 80 advances one or both of the ram 90-1 and/or base cylinders 90-2 as needed to establish and maintain a desired clamping force, or to alter the clamping force according to one or more preselected clamping force parameters. The clamping force transducers of the load cells 63 might be strain gauge based transducers that detect strain due to the clamping force, in one example.

In an alternate embodiment, the load cells 63 might be positioned inside or otherwise secured to one or both of the upper and/or the center plates 110, 115. In a further alternate embodiment, the load cells 63 are positioned inside or otherwise secured to one or both cylinders 90-1, 90-2. In a non-limiting example, each of the draw rings 20, 40 may include one or more load cells 63 installed into a cavity formed within the rings 20, 40 to receive the load cell therein.

In a non-limiting exemplary embodiment, the clamping force is determined by a calibration method. In this method, a clamping force is obtained by converting the measured hydraulic pressure in the ram cylinder 90-1 and the base cylinders 90-2 using pressure transducers. This pressure is converted into applied force using the cylinders' internal bore dimensions. The controller 80 specifies the required clamping force to be applied by the base cylinders 90-2 and synchronizes the force applied by the ram cylinder 90-1 in order for the clamped assembly to displace at the desired rate.

In a non-limiting exemplary embodiment, the clamping force ranges between 8.9 kilo newtons (kN) and 890 kN, or between 1-600 US tons. This is because 600 US tons=5,337,866 N and 1 US ton short=8,896 N.

FIG. 5C shows a next stage of operation of the system 10-1. Here, the clamped assembly 62 is advanced as a unit towards the punch 50. The figure shows an instant in time when the prepreg stack 30 is partially drawn at a drawing depth that is less than a desired drawing depth 58 of the prepreg stack 30. The desired drawing depth 58 is measured from a starting point on the punch longitudinal axis 17 that is on a same horizontal plane as the contact surface 24 of the forming draw ring 20, to an end point on the axis 17 that is above the level of the non-contact surface 26.

During the drawing process, the punch remains stationary relative to the clamped assembly 62. Synchronized movement of each of the ram cylinder 90-1 and the base cylinders 90-2 causes the clamped assembly 62 to advance towards the punch at a predetermined draw rate while maintaining the clamping force. As the clamped assembly 62 nears the punch, the punch crown 56 begins to enter the non-forming aperture a2 and contacts the prepreg stack 30 at the bottom fiber layer 16-1 of its bottom-most ply 39.

During the initial advancement of the clamped assembly 62, the inner portion 14 of the prepreg stack 14 begins to stretch and form over the punch crown 56 and punch external surface 54. At the same time, the flange 12 is clamped between the non-forming draw ring 40 and the forming draw ring 20 and slips inward radially. When the crown 56 of the punch external surface 54 reaches the forming aperture a1, the forming aperture perimeter surface 28 receives the prepreg stack 30 that is draped over the punch crown 56 and punch external surface 54.

The inside perimeter surface 28 guides the inner surface 14 of the prepreg stack 30 and punch external surface 54 into the forming aperture a1 of the forming draw ring 20. During this process, the top fiber layer 16-4 of the top-most ply 39 is in contact with the inner perimeter surface 28.

As the clamped assembly 62 continues to advance toward the punch 50, the inner portion 14 of prepreg stack 30 is drawn into the forming aperture a1 and begins to conform to the shape of the punch external surface 54 and crown 56. This shape is an inner portion of the helmet preform 76 under formation.

At some point during the advancement of the clamped assembly 62, the flange 12 is also drawn into the forming aperture a1. This process is also known as sliding. The flange 12 of the prepreg stack 30 is drawn into the forming aperture a1 when a radial force at the inner portion 14 overcomes/is greater than a static friction force at the flange 12. The radial force is generated by the drawing action of the inner portion 14 against the punch crown 56 and the punch external surface 54, while the friction force is due to clamping force applied by the synchronized ram cylinder 90-1 and the base cylinders 90-2 to the rings 20, 40 (and thus to the flange 12 located between the rings 20, 40).

With further movement of the clamped assembly 62 toward the punch 50, the flange 12 is further drawn through the forming aperture a1. The system 10-1 is configured such that the flange 12 is drawn/slides gradually with minimal wrinkling, tearing and/or disruption to the pattern of the fibers 18 of the prepreg stack 30.

As the flange 12 is further drawn into the forming aperture a1, the surface area of the flange 12 is continuously reduced. As the area of the flange decreases, the clamping pressure at the flange 12 correspondingly increases. This clamping pressure is the result of the clamping force distributed over the entire area of the flange 12. The pressure at the flange 12 is according to the following equation:

$$\text{Pressure} = \text{clamping force (e.g., in newtons)} / \text{flange area (e.g., in cm}^2\text{)}$$

The clamping force created by ram cylinder 90-1 and the base cylinders 90-2 and applied to the rings 20, 40 is sometimes expressed as "tonnage."

Based on the pressure equation, as the area of the flange 12 decreases, the pressure at the flange 12 increases (as long as the clamping force remains constant) and the total surface area of the flange remaining between rings 20, 40 decreases. This affects the pulling force of the flange 12 towards the forming aperture a1 in the forming ring 20 and against the punch 50. The sufficiently high clamping force promotes creation of the helmet preform 76 because it encourages fiber reorientation of the plies 39 to conform the prepreg stack 30 to the compound curvature of the external surface 54 of the punch 50.

Fiber reorientation in the prepreg stack 30 changes as the flange 12 slides between the contact surfaces 24, 44 of the rings 20, 40 during drawing, which can reduce wrinkling in the resulting helmet preform 76.

However, too high clamping force might cause tearing of or otherwise disrupt the pattern of fibers 18 of the prepreg stack 30 during drawing, and ultimately weaken the helmet preform 76 under formation. The sliding of the flange 12 can become non-uniform with intermittent jumps, or can stop altogether before the desired drawing depth is reached. This can damage the fibers 18 of the prepreg stack 30 during the drawing, or cause its normally ordered rows of fibers to separate or spread out, a process known as "disorganizing" of the fibers 18. Damaged and disorganized fibers 18 impact the ballistic and structural integrity of the helmet preform 76, which is undesirable. As a result, it is important to monitor and control the clamping force during the drawing process.

There are various ways for controlling the clamping pressure to avoid damaging or disorganizing the fibers 18 during drawing of the prepreg stack 30. One way is to draw the prepreg stack 30 at a continuous velocity or draw rate over the duration of the drawing, while adjusting the material retention. To achieve this, the clamping force applied by the ram cylinder 90-1 and the base cylinders 90-2 is changed over the draw as a function of drawing depth. In one example, the clamping force is decreased or increased in a substantially linear fashion e.g., by a substantially linear continuous change in clamping force as a function of flange area reduction, e.g., starting when the prepreg stack 30 makes initial contact with the punch crown 56 and continuing the linear decrease or increase in clamping force until the desired drawing depth 58 is achieved.

Alternatively, the clamping force can be intermittently changed at predetermined drawing depths to control the clamping pressure during the draw. In one example, the initial clamping force might be decreased by a percentage amount such as between 5 and 10%, once the drawing depth is at 10% of the desired drawing depth 58. The clamping force would then be decreased by the same percentage amount when the drawing depth has again increased by 10% of the desired drawing depth 58. This intermittent change in clamping force continues until the desired drawing depth 58 is achieved. Still another option is to program individual clamping force values to change in a substantially non-linear fashion e.g., a continuous or intermittent change in clamping force as a function of flange area reduction, or in proportion to drawing depths until the desired drawing depth 58 is achieved.

Another way to avoid damaging or disorganizing the fibers 18 during drawing of the prepreg stack 30 is to draw the prepreg stack 30 in two or more drawing steps. Here, at least two different steps with a separately configured drawing rate for each step might be selected. Within each drawing step, the drawing rate might be constant, continuously varied, or intermittently varied; the clamping force applied in each step might be constant or varied. In another example, the force applied over each step might be tailored to specific drawing depths of the punch 50. Here, the drawing depths of the punch 50 might be correlated with the locations of specific features on the punch exterior surface 54.

FIG. 5D shows a final operational stage of the system 10-1 when creating the helmet preform 76. At this stage, the crown 56 of the punch 50 has reached the desired drawing depth 58. As compared with FIG. 5C, the area of the flange 12 clamped between the forming and non-forming draw rings 20, 40 has decreased, while the area of the prepreg stack 30 that has been drawn through the forming aperture a1 has increased.

Once the punch 50 has reached the desired drawing depth 58, the helmet preform 76 is typically removed from the helmet forming system 10-1 for secondary helmet forming processing to create a deep drawn helmet. The secondary helmet forming processing is also known as consolidation processing. In one implementation, the deep drawn helmet 96 may be formed from an assembly of two or more deep drawn helmet preforms 76 created by the system 10 and nested together, and then provided as input to the consolidation process.

FIG. 6 shows detail for an alternate embodiment of the clamped assembly 62 in the helmet forming system 10-1. In the illustrated example, a sacrificial layer 140 is added between the contact surface 24 of the forming draw ring 20 and the top layer 16-1 of prepreg stack 30 and the vacuum bag 19. Additionally or alternatively, a second sacrificial layer 240 is added between the contact surface 44 of the non-forming draw ring 40 and the bottom layer 16-4 of prepreg stack 30 and the vacuum bag 19. The clamped assembly 62 also includes a different embodiment of the forming draw ring 20 than the ring 20 shown in FIG. 5A and the ring 20 shown in FIG. 5A-5D.

In a non-limiting exemplary embodiment, the one or more sacrificial layers 140, 240 are configured to control friction between/adjust a friction coefficient of the contact surfaces 24, 44 of the draw rings 20, 40 and the prepreg stack 30 during drawing. Specifically, one or more sacrificial layers 140 may be added between the contact surface 44 of the non-forming draw ring 40 and a bottom surface of the prepreg stack 30 to control friction during drawing, and one or more sacrificial layers 240 may be added between the contact surface 24 of the forming draw ring 20 and a top surface of the prepreg stack 30 to control friction during drawing.

These sacrificial layers 140, 240 can be configured with variable friction modifying properties. For example, the sacrificial layer 140 can be configured to adjust friction between the contact surface 24 and the top layer 16-1 in a fashion that is greater or less than that configured for sacrificial layer 240 for adjust friction between the contact surface 44 and the flange 12/bottom layer 16-4. In either case, the sacrificial layers 140, 240, are drawn with the prepreg stack 30 through the forming aperture a1 during drawing. Accordingly, the sacrificial layer 140 is in contact with the inner perimeter surface 28 of the aperture a1 and can further adjust friction between the prepreg stack top layer 16-1 and the forming aperture a1, or otherwise prevent damage to or misplacement of the prepreg fibers 18 during the deep drawing process.

Another non-limiting exemplary embodiment of a forming draw ring 20 is shown in the figure. The forming draw ring 20 includes an extended portion 21. The extended portion 21 includes an extended perimeter surface 28a that extends upward from the non-contact surface 26 to a height h3. The height h3 is from the non-contact surface 26 to a top 49 of the extended portion 21. The extended portion 21 is configured to reduce bridging in the helmet preform, in one example.

In the illustrated example, the extended portion 21 is fixedly attached to the forming draw ring 20 at its non-contact surface 26 and is centrally aligned with respect to the punch longitudinal axis 17. Alternatively, the forming draw ring 20 with extended portion 21 is formed or otherwise created from a unitary piece of material stock.

In more detail, the inner perimeter surface 28 of the forming draw ring 20 is widest at the contact surface 24 and narrowest at height h3. The inner perimeter surface 28 curves inward and upward from the contact surface 24 to height h1 towards the non-contact surface 26, and then upward to height h3. Typically, the inner perimeter surface 28 at height h1 is wider than at height h3. Generally, the profile shape of the entire surface 28 is important and also a function of the punch geometry.

In the illustrated example, the extended portion 21 surrounds/encircles the entirety of the forming aperture a1 for 360 degrees. However, other embodiments might provide the extended aperture portion 21 in selected regions of the ring, e.g., in locations where the prepreg stack 30 fails to stay in contact with the punch external surface 54 during drawing. In this example, the extended portion 21 does not surround the entire forming aperture a1.

FIG. 7 shows a deep drawn helmet preform 76 that is created according to the method of FIG. 4. Various fiber directions of the marked grid 32 are shown on the helmet preform 76.

Reference 702 illustrates an area of the helmet preform 76 with some wrinkling/e.g., disorganization of the fibers 18 that form the helmet preform 76. The wrinkled area 702 is approximately centered by the helmet preform right side 33R and is nearly centrally aligned with the 90-degree direction 36.

Also shown is a portion of the flange 12 that was not fully drawn between the forming and non-forming rings 20, 40 during the helmet preform drawing process, during the research and development phase. The helmet preform 76 shows the square marked grid 32 that was marked on the prepreg stack before forming, as is shown in FIG. 3A. In the illustrated example, the shape of each formerly square marking has changed in the helmet preform 76 due to material deformation. In one example, the square markings extending along a 45-degree direction 37 appear to have a smaller area than the square markings in the wrinkled area 702.

If the preform 76 shown in FIG. 7 shows unacceptable wrinkling, one or more combinations of the following might be employed: using draw rings 20 and/or 40 with temperature control zones that are sized in accordance with the wrinkled area 702 of the last preform created, and applying different temperatures to one or more of the zones during drawing; changing the clamping force upon the clamped assembly 62; changing the rate of drawing; using one or more sacrificial layers 140 to adjust friction (e.g., increase or decrease) at the flange 12 during the drawing; and using draw rings 20, 40 that each (or both) have surface features designed to control sliding of the flange 12 during drawing, as provided in the description of FIG. 8A-8D included herein below.

FIG. 8A-8D show portions of exemplary non-forming draw rings 40. Each shows a different surface feature 49 incorporated upon or within the contact surface 44. Experimentation has shown that these surface features can control sliding, i.e., increase or decrease friction of the flange 12 of the prepreg stack 30 between the forming and non-forming draw rings 20, 40 during the forming of the helmet preform 76, possibly without the need to change the clamping force applied to the flange 12 during drawing. Because the surface features 49 control sliding between the flange 12 and the contact surfaces 24, 44 during the forming of the helmet preform, greater thickness uniformity, and less wrinkling and bridging of the resulting helmet preform has been observed as compared to using substantially flat, feature-less contact surfaces 24, 44.

Figure 8A:
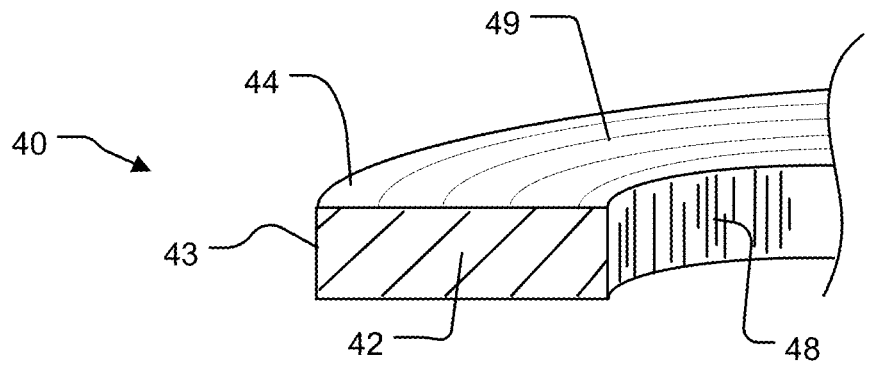
Figure 8B:
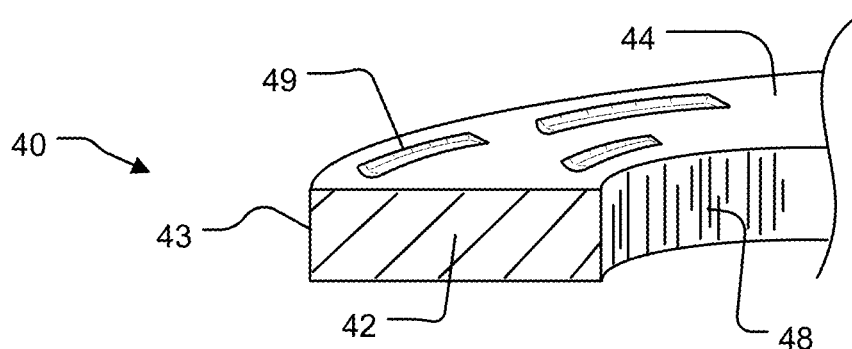
Figure 8C:
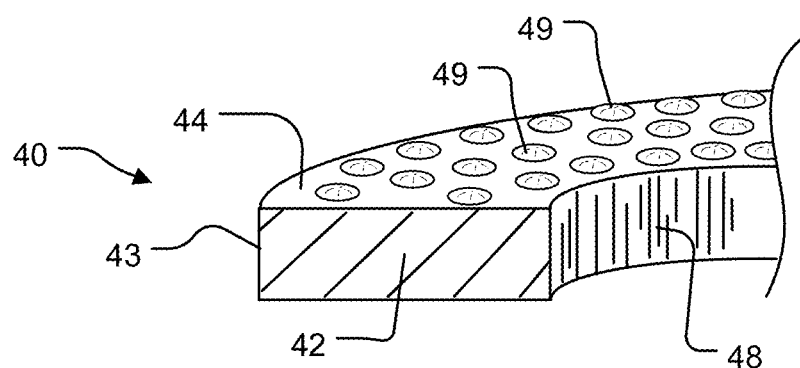

FIG. 8A shows concentric lines or grooves 49-1 as a surface feature 49. The grooves 49-1 are etched into the contact surface 44 of the non-forming draw ring 40. FIG. 8B shows channel surface features 49-2 formed in the rigid body 42 that sit below the contact surface 44. FIG. 8C shows raised circular features 49-3, or dimples that sit upon the contact surface 44.

Figure 8D:
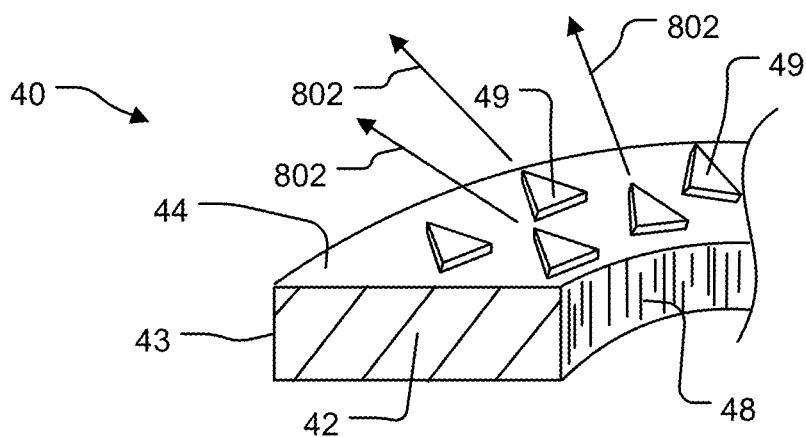

FIG. 8D shows triangular-shaped surface features 49-4 that sit upon the surface 44. The features 49-4 are formed such that a base of each triangle faces towards the inner perimeter surface 48, and each feature directs friction away from the rigid body 42 in a radial direction 802 from the inner perimeter surface 48 towards the outer perimeter surface 43. In the illustrated example, the triangular-shaped features 49-4 are raised with respect to the contact surface 44 and are shaped as isosceles triangles. In this way, for each feature, the point opposite the base of each triangle is substantially coincident with the direction 802 of the radial force that each feature directs away from the inner perimeter surface 48 towards the outer perimeter surface 43.

In another example, the triangles might have an elongated shape but are not radially directed outward towards the outer perimeter surface 43. Instead, the triangles are oriented at different angles selected to guide the sliding of the flange in a particular direction.

Other implementations of the surface features 49 are possible. In one example, the surface features 49 can be included in/upon the contact surface 24 of the forming draw ring 20. In another example, the surface features 49 can be included in/upon both the contact surface 44 of the non-forming draw ring 40 and the contact surface 24 of the forming draw ring 20.

These surface features 49 on the contact surfaces 24, 44 of the opposing rings 20, 40 can be identical, dissimilar or complementary, in examples.

The surface features 49 can also be evenly distributed over one or both of the contact surfaces 24, 44 or placed at predetermined locations on one or both of the contact surfaces 24, 44. In the latter case, in one example, a forming draw ring 20 might be configured such that a grouping of surface features might be placed in an area of the contact surface 24 that is adjacent to the wrinkled area 702 of the preform in FIG. 7. Because the wrinkled area 702 was the only area of the preform 76 that exhibited an unacceptable level of wrinkling, the remainder of the contact surface 24 might be free of surface features.

FIG. 9A shows a pressure vessel 1002 incorporated into the system 10-1 of FIG. 1. The pressure vessel 1002 has a chamber 1004 and a sealing mechanism 1006. In examples, the sealing mechanism might be an O-ring, a metal ring with a flange, or other type of gasket that forms a pressure seal between the pressure vessel 1002 and the non-contact surface 26 of the forming draw ring 20. The pressure vessel 1002 is housed by the ram system 60, where the ram system 60 urges the sealing mechanism 1006 against the non-contact surface 26 of the forming draw ring 20 during the formation of the helmet preform 76. In another example, the pressure vessel 1002 might be permanently attached and sealed to the non-contact surface 26 of the forming ring 20. Typically, the chamber 1004 is filled with air, gas or a fluid at a pressure of between 100 and 600 pounds per square inch (psi). In the case of fluids, an upper pressure range could be as high at 10,000 psi, or possibly higher.

FIG. 9B shows a counterpunch 1010 incorporated into the system 10-1 of FIG. 1. The counterpunch 1010 has a cavity 1012 with an inside surface 1014. The inside surface 1014 has a shape that is substantially similar to the shape of the punch external surface 54. The counterpunch 1010 is housed by the ram system 60, where the ram system 60 urges the counterpunch 1010 towards the non-contact surface 26 during the formation of the helmet preform 76. As the punch 50 nears the desired drawing depth 58, the counterpunch 1010 is urged against the inner portion 14 of the outside ply 16-4 of the prepreg stack 30 to assist in the formation of the helmet preform 76. In this way, the counterpunch 1010 functions as a die that can refine the shape of the helmet preform 76.

FIG. 10 is a block diagram of an alternate helmet forming system 10-2, constructed in accordance with principles of the present invention. The alternate helmet forming system 10-2 has substantially similar components and operates in a substantially similar manner as the helmet forming system 10-1 of FIG. 1. However, there are differences.

The non-forming draw ring 40 of system 10-1 is replaced by a binder ring 100 in system 10-2. The forming draw ring 20 of system 10-1 is replaced by a draw ring assembly 1200 in system 10-2. At the same time, the temperature control system 70 can independently control the temperatures of the punch 50, the binder ring 100 and the draw ring assembly 1200.

FIG. 11A shows one implementation for the draw ring assembly 1200 in FIG. 10, indicated by reference 1200-1. The draw ring assembly 1200-1 includes two or more forming draw rings of possibly different heights.

In the illustrated example, the draw ring assembly 1200-1 includes three forming draw rings r1, r2, and r3. Ring r1 has a top t1, a bottom b1, an inner perimeter surface 1240, a height h5 measured from b1 to t1. Here, b1 is also a contact surface 1206 of the assembly 1200-1. Ring r2 has a top t2, a bottom b2, an inner perimeter surface 1242 and a height h6 measured from b2 to t2. Ring r3 has a bottom b3 and a top t3, an inner perimeter surface 1244, a height h7 measured from b3 to t3. Here, t3 is also a non-contact surface 1204 of the assembly. The inner perimeter surfaces 1240, 1242 and 1244 respectively define forming apertures 1212, 1214, and 1216. One or more of the forming draw rings r1-r3 connect to the temperature control system 70.

The rings r1-r3 are arranged as follows to promote improved material flow of the prepreg stack 30 during forming of the helmet preform 76. Ring r1 has the widest aperture 1212 and its bottom b1 faces the top layer of the prepreg stack 30 (not shown). Ring r2 is stacked on top of ring r1 and is smaller in diameter than ring r1, and ring r3 stacked on top of ring r2 and is smaller in diameter than ring r2. The rings r3, r2, and r1 are centrally aligned with respect to the punch longitudinal axis 17. The bottom b3 of ring r3 rests on the top t2 of ring r2, and the bottom b2 of ring r2 rests on the top t1 of ring r1. The bottom b1 of ring r1 is a contact surface that comes into contact with the top of the prepreg stack 30 during forming of the helmet preform 76. In this way, the assembly of forming draw rings 1200-1 creates an extended surface which guides the prepreg stack 30 during the drawing.

The apertures of each of the rings r3, r2, and r1 are each successively tapered or otherwise profiled slightly inward towards the punch longitudinal axis 17. Each of the inner perimeter surfaces 1240, 1242 and 1244 are widest at the bottoms b1, b2 and b3 of the rings and narrowest at the tops t1, t2 and t3 of rings r1, r2 and r3, respectively.

FIG. 11B shows another implementation of a draw ring assembly 1200 in FIG. 10, indicated by reference 1200-2. The draw ring assembly 1200-2 has a rigid body 1202, a non-contact surface 1204, a contact surface (not shown) that opposes the non-contact surface 1204, a back 1209 and a front 1207 portion. The draw ring assembly 1200-2 includes an adjustable ring 1220 that can adjust the forming aperture a3 of the draw ring assembly 1200-2 during operation of the system 10-2. The rigid body 1202 and the adjustable ring 1220 connect to the temperature control system 70 and the adjustable ring 1220 connects to and is under control of the controller 80.

The adjustable ring 1220 defines an inner perimeter surface 1228 that in turn defines a forming aperture a3. The adjustable ring 1220 can be adjusted during creation of the helmet preform 76, which correspondingly adjusts the inner perimeter surface 1228. In turn, the change in the inner perimeter surface 1228 modifies the forming aperture a3. In one example, the adjustable ring 1220 adjusts the forming aperture a3 as a function of the drawing depth. In one example, the controller 80 can direct the ring 1220 to synchronize adjustment of the aperture a3 with the position of the punch 50 during the forming of the deep drawn helmet preform.

As with the forming and non-forming draw rings 20, 40, it can also be appreciated that different portions or areas of the adjustable diaphragm 1200 might be configured as independently heated and cooled zones z, separated by separators s.

FIGS. 12A and 12B are front and top views, respectively, of a deep drawn helmet 96 formed after completion of the method of FIG. 4. Here, a helmet preform 76 has been further molded or formed into the final shape of the deep-draw helmet 96 via a consolidation process.

The deep drawn helmet 96 includes earcup portions 1304. During the consolidation process, force is transferred over the surface of the helmet preform 76. This force is designed to further refine the shape of the deep drawn helmet 96.

More detail for the consolidation process is as follows. The helmet forming system 10 (or another helmet forming system) subjects the helmet preform 76 to a predetermined combination of high temperature and pressure over a time period to bond components of the helmet preform 76 including fibers, resins and adhesives into a seamless helmet 96 with minimal presence of wrinkles and variation in thickness. By minimizing the wrinkles and thickness gradients, the consolidation process produces a completed helmet 96 with maximized ballistic non-ballistic (structural) performance characteristics.

The consolidation process typically uses a matched set of dies, an outer and an inner die to form a mold. The outer die is similar to the counterpunch 1010 in FIG. 9B. The outer die is typically rigid/made of metal and has a cavity with an inside surface. The inside surface has a shape that defines the shape of the external surface of the helmet 96 to be created. The inner die is also typically rigid/made of metal and has a surface that is akin to the punch external surface 54. The surface of the inner die defines the inner shape of the helmet 96. The outer and inner dies are also known as a final cavity and a core, respectively, and are each conformal to the final shape of the helmet 96.

Matched metal dies can be incorporated into the helmet forming system 10 as follows to perform the consolidation process. After the helmet preform 76/preforms are completed, the technician removes the helmet preform 76 and configures the helmet forming system 10 for the consolidation process. For this purpose, the technician might remove the forming draw ring 20 from the upper plate 115 and remove the non-forming draw ring 40 from the center plate 110. The technician then incorporates the final cavity and core into the system 10. Alternatively, the technician might perform the consolidation process on the one or more helmet preforms 76 using a separate helmet forming system such as a hydraulic press that is preconfigured and dedicated to consolidation.

To incorporate the final cavity and core into the helmet forming system 10, in one example, the technician removes the punch 50 and the center plate 110. The technician attaches the final cavity to the ram system 60 in a similar manner as the counterpunch 1010 in FIG. 9B, and replaces the center plate with a version that does not have a center aperture. Instead, the replacement center plate provides removable attachment of the core and enables alignment of the core with the final cavity. The technician then places the helmet preform 76 such that its inside surface rests on the core with a desired orientation relative to the final cavity. The technician then attaches the final cavity and the core to the temperature control system 70. The temperature control system 70 provides both heating and cooling of the mold (i.e. the final cavity and core).

The technician then loads a parameter file 82 for the consolidation process and the controller 80 executes the file 82 to begin the process. During the consolidation process, in accordance with the parameters specified in the parameter file 82, the controller 80 advances the ram cylinder 90-1 downward to move the final cavity against the outer surface of the helmet preform 76 under sufficient temperature and pressure. At the same time, the controller 80 advances the base cylinders 90-2 upward to move the core against the inner surface of the helmet preform 76 under sufficient temperature and pressure. After a cooling period, the final cavity is moved away from the core, and the technician removes the completed deep drawn helmet 96.

During the consolidation process, the temperature and/or pressure applied to the final cavity and core can be configured independently and with different temperature and pressure values. The pressure and sufficiently high temperature force the resin of the prepreg stack 30 into the void spaces between its fibers 18, thus bonding the plies 39 of the helmet preform 76 and transforming the preform into the ballistic helmet 96.

In one implementation, one or both of the final cavity and the core are not rigid. If the cavity is not rigid, in one example, the cavity is included in a chamber filled with a fluid, which can be pressurized and its temperature may be controlled. The helmet preform 76, while heated, is subjected to an isostatic pressure of sufficient magnitude by pressurizing the chamber. If the core is not rigid, a similar configured chamber that includes the core is used.

When both the cavity and core are rigid/made of metal, they form a mold also known as a matched-metal tool. In one implementation, the matched metal tool might also incorporate a shear edge cutting means. This cutting means removes any remaining flange 12 from the helmet preform 76 once the final cavity and core enclose the helmet preform 76 and are placed under pressure. A matched metal tool with the shear edge cutting means is also known as a closed matched-metal tool, while a tool without this means is known as an open matched-metal tool. After the helmet 96 is cooled and removed from the open mold and helmet forming system 10, the bottom part of the helmet 96 might further be trimmed by a method suitable for composites.

An example of a consolidation process using an open matched-metal tool in a helmet forming system is as follows. To accelerate the process, the technician may pre-heat a completed helmet preform 76 to a predetermined temperature, and place the inside of the helmet preform 76 such that it seats or otherwise rests upon the core of the open matched-metal tool.

In one example, the helmet preform 76 placed upon the core includes all necessary components of the ballistic helmet 96 to be created. In another example, the technician might add additional elements to the helmet preform 76 to improve its ballistic, structural and cosmetic properties. These elements are typically additional material layers, the technician might add one or more plies 39 or portions of the plies to the preform 76. The additional materials/plies 39 might be added to one or both sides of the preform 76 (such as to increase the area or thickness of the earcups 1304), or to any other portion or surface of the helmet preform 76. Additional elements can also be comprised of inserts to provide attachment points for subsequent system integration, or reinforcement to encase the unfinished edge of the consolidated helmet.

The technician then executes a parameter file 82 on the controller 80 for the consolidation process. In response, the controller 80 directs one or more of the cylinders 90 to advance towards one another (e.g., under mechanical means) to close the mold, by moving the final core and cavity towards one another under a specified pressure. The controller 80 also directs the temperature control system 70 to heat the mold to a specific temperature. The force applied to the mold is typically in a range between 10 and 600 tons, and preferably between 100 and 500 tons. Alternatively, the load force is applied by a hydraulic press involving hydraulic fluids and is controlled by any appropriate hydraulic, automatic, or electronic means.

After a sufficient time period, the completed deep drawn helmet 96 is cooled down to a sufficiently low temperature, which typically is slightly above room temperature. The technician opens the mold and removes the completed helmet 96. Final finishing of the bottom part of the helmet from an open mold is done using a cutting method appropriate for the helmet material. It may be done using a mechanical saw, laser cutting, a water jet or the like. In the case of a closed mold, the consolidated helmet 96 may substantially already be in the net-shape (final) desired form.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

It will also be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

What is claimed is:

1. A method for creating a deep drawn helmet, the method comprising:
  supporting a stack of prepreg material layers ("prepreg stack") between a forming aperture of a forming draw ring and a non-forming aperture of a non-forming draw ring, the forming draw ring and the non-forming draw ring each having a metal rigid body bounded by a contact surface and a non-contact surface opposed to the contact surface;
  clamping the prepreg stack between the contact surface of the forming draw ring and the contact surface of the non-forming draw ring, a result of which forms a clamped assembly of the forming draw ring, the prepreg stack, and the non-forming draw ring;
  advancing the prepreg stack relative to a punch to form a deep drawn helmet preform, during which a clamping force is applied to the clamped assembly, and during which the punch enters and passes through the non-forming aperture and then draws an inner portion of the prepreg stack through the forming aperture until a desired drawing depth of the prepreg stack is achieved;

providing temperature control of the punch, the forming draw ring and the non-forming draw ring, the temperature control including heating and cooling, wherein providing temperature control of the forming draw ring and the non-forming draw ring comprises constructing the forming draw ring and/or the non-forming draw ring to include different temperature control zones and controlling each of the temperature control zones; and creating the deep drawn helmet from the deep drawn helmet preform.

2. The method of claim 1, wherein the advancing to form the deep drawn helmet preform is accomplished on a first helmet forming system, and wherein the creating of the deep drawn helmet from the deep drawn helmet preform is accomplished using a second helmet forming system different than the first helmet forming system.

3. The method of claim 1, wherein the advancing to form the deep drawn helmet preform and the creating of the deep drawn helmet from the deep drawn helmet preform are accomplished using a same helmet forming system.

4. The method of claim 1, wherein creating the deep drawn helmet from the deep drawn helmet preform comprises:
  identifying an outer die having an inside surface with a first shape that defines an external surface of the deep drawn helmet, and placing the inside surface of the outer die to be near an external surface of the deep drawn helmet preform;
  identifying an inner die having an outside surface with a second shape that defines an inside surface of the deep drawn helmet, and placing the outside surface of the inner die to be near the inside surface of the deep drawn helmet preform;
  aligning the outer die, the deep drawn helmet preform and the inner die and attaching the outer die and the inner die to the temperature control system; and
  advancing the outer die and/or the inner die towards the deep drawn helmet preform under a predetermined temperature and pressure to create the deep drawn helmet.

5. The method of claim 4, further comprising removing the forming draw ring and the non-forming draw ring prior to placing the inside surface of the outer die to be near the external surface of the deep drawn helmet preform.

6. The method of claim 4, further comprising removing the punch prior to aligning the outer die, the deep drawn helmet preform and the inner die.

7. A method for creating a deep drawn helmet, the method comprising:
  supporting a stack of prepreg material layers ("prepreg stack") between a forming aperture of a forming draw ring and a non-forming aperture of a non-forming draw ring, the forming draw ring and the non-forming draw ring each having a metal rigid body bounded by a contact surface and a non-contact surface opposed to the contact surface;
  clamping the prepreg stack between the contact surface of the forming draw ring and the contact surface of the non-forming draw ring, a result of which forms a clamped assembly of the forming draw ring, the prepreg stack, and the non-forming draw ring;
  advancing the prepreg stack relative to a punch to form a deep drawn helmet preform, during which a clamping force is applied to the clamped assembly, and during which the punch enters and passes through the non-forming aperture and then draws an inner portion of the prepreg stack through the forming aperture until a desired drawing depth of the prepreg stack is achieved;
  providing temperature control of the punch, the forming draw ring and the non-forming draw ring, the temperature control including heating and cooling;
  creating the deep drawn helmet from the deep drawn helmet preform, comprising;
    identifying an outer die having an inside surface with a first shape that defines an external surface of the deep drawn helmet, and placing the inside surface of the outer die to be near an external surface of the deep drawn helmet preform;
    identifying an inner die having an outside surface with a second shape that defines an inside surface of the deep drawn helmet, and placing the outside surface of the inner die to be near the inside surface of the deep drawn helmet preform;
    aligning the outer die, the deep drawn helmet preform and the inner die and attaching the outer die and the inner die to the temperature control system; and
    advancing the outer die and/or the inner die towards the deep drawn helmet preform under a predetermined temperature and pressure to create the deep drawn helmet; and
  adding one or more additional layers of prepreg material to the deep drawn helmet preform to improve ballistic, structural and cosmetic properties of the deep drawn helmet prior to advancing the outer die and/or the inner die towards the deep drawn helmet preform under temperature and pressure to create the deep drawn helmet.

8. A method for creating a deep drawn helmet, the method comprising:
  supporting a stack of prepreg material layers ("prepreg stack") between a forming aperture of a forming draw ring and a non-forming aperture of a non-forming draw ring, the forming draw ring and the non-forming draw ring each having a metal rigid body bounded by a contact surface and a non-contact surface opposed to the contact surface;
  clamping the prepreg stack between the contact surface of the forming draw ring and the contact surface of the non-forming draw ring, a result of which forms a clamped assembly of the forming draw ring, the prepreg stack, and the non-forming draw ring;
  advancing the prepreg stack relative to a punch to form a deep drawn helmet preform, during which a clamping force is applied to the clamped assembly, and during which the punch enters and passes through the non-forming aperture and then draws an inner portion of the prepreg stack through the forming aperture until a desired drawing depth of the prepreg stack is achieved;
  providing temperature control of the punch, the forming draw ring and the non-forming draw ring, the temperature control including heating and cooling;
  creating the deep drawn helmet from the deep drawn helmet preform, comprising;
    identifying an outer die having an inside surface with a first shape that defines an external surface of the deep drawn helmet, and placing the inside surface of the outer die to be near an external surface of the deep drawn helmet preform;
    identifying an inner die having an outside surface with a second shape that defines an inside surface of the deep drawn helmet, and placing the outside surface of the inner die to be near the inside surface of the deep drawn helmet preform;

aligning the outer die, the deep drawn helmet preform and the inner die and attaching the outer die and the inner die to the temperature control system; and advancing the outer die and/or the inner die towards the deep drawn helmet preform under a predetermined temperature and pressure to create the deep drawn helmet, comprising:

including the outer die in a chamber filled with fluid and placed under temperature and pressure, the outer die having a non-rigid surface; and advancing the chamber towards the deep drawn helmet preform under temperature and pressure.

9. A method for creating a deep drawn helmet, the method comprising:

supporting a stack of prepreg material layers ("prepreg stack") between a forming aperture of a forming draw ring and a non-forming aperture of a non-forming draw ring, the forming draw ring and the non-forming draw ring each having a metal rigid body bounded by a contact surface and a non-contact surface opposed to the contact surface;

clamping the prepreg stack between the contact surface of the forming draw ring and the contact surface of the non-forming draw ring, a result of which forms a clamped assembly of the forming draw ring, the prepreg stack, and the non-forming draw ring;

advancing the prepreg stack relative to a punch to form a deep drawn helmet preform, during which a clamping force is applied to the clamped assembly, and during which the punch enters and passes through the non-forming aperture and then draws an inner portion of the prepreg stack through the forming aperture until a desired drawing depth of the prepreg stack is achieved;

providing temperature control of the punch, the forming draw ring and the non-forming draw ring, the temperature control including heating and cooling;

creating the deep drawn helmet from the deep drawn helmet preform, comprising;

identifying an outer die having an inside surface with a first shape that defines an external surface of the deep drawn helmet, and placing the inside surface of the outer die to be near an external surface of the deep drawn helmet preform;

identifying an inner die having an outside surface with a second shape that defines an inside surface of the deep drawn helmet, and placing the outside surface of the inner die to be near the inside surface of the deep drawn helmet preform;

aligning the outer die, the deep drawn helmet preform and the inner die and attaching the outer die and the inner die to the temperature control system; and advancing the outer die and/or the inner die towards the deep drawn helmet preform under a predetermined temperature and pressure to create the deep drawn helmet, comprising:

including the inner die in a chamber filled with fluid and placed under temperature and pressure, the inner die having a non-rigid surface; and advancing the chamber towards the deep drawn helmet preform under temperature and pressure.

10. A method for creating a deep drawn helmet, the method comprising:

supporting a stack of prepreg material layers ("prepreg stack") between a forming aperture of a forming draw ring and a non-forming aperture of a non-forming draw ring, the forming draw ring and the non-forming draw ring each having a metal rigid body bounded by a contact surface and a non-contact surface opposed to the contact surface;

clamping the prepreg stack between the contact surface of the forming draw ring and the contact surface of the non-forming draw ring, a result of which forms a clamped assembly of the forming draw ring, the prepreg stack, and the non-forming draw ring;

advancing the prepreg stack relative to a punch to form a deep drawn helmet preform, during which a clamping force is applied to the clamped assembly, and during which the punch enters and passes through the non-forming aperture and then draws an inner portion of the prepreg stack through the forming aperture until a desired drawing depth of the prepreg stack is achieved;

providing temperature control of the punch, the forming draw ring and the non-forming draw ring, the temperature control including heating and cooling;

creating the deep drawn helmet from the deep drawn helmet preform, comprising;

identifying an outer die having an inside surface with a first shape that defines an external surface of the deep drawn helmet, and placing the inside surface of the outer die to be near an external surface of the deep drawn helmet preform;

identifying an inner die having an outside surface with a second shape that defines an inside surface of the deep drawn helmet, and placing the outside surface of the inner die to be near the inside surface of the deep drawn helmet preform;

aligning the outer die, the deep drawn helmet preform and the inner die and attaching the outer die and the inner die to the temperature control system; and advancing the outer die and/or the inner die towards the deep drawn helmet preform under a predetermined temperature and pressure to create the deep drawn helmet, comprising:

including the outer die in a first chamber filled with fluid and placed under temperature and pressure, the outer die having a non-rigid surface;

including the inner die in a second chamber filled with fluid and placed under temperature and pressure, the inner die having a non-rigid surface; and advancing the first chamber and/or the second chamber towards the deep drawn helmet preform under temperature and pressure.

11. A method for creating a ballistic helmet, the method comprising:

supporting a stack of prepreg materials ("prepreg stack") between a forming aperture of a forming draw ring and a non-forming aperture of a non-forming draw ring, the forming draw ring and the non-forming draw ring each having a metal rigid body bounded by a contact surface and a non-contact surface opposed to the contact surface;

clamping the prepreg stack between the contact surface of the forming draw ring and the contact surface of the non-forming draw ring, the result of which forms a clamped assembly of the forming draw ring, the prepreg stack, and the non-forming draw ring;

advancing the prepreg stack of the clamped assembly relative to a punch to form a deep drawn helmet preform;

providing temperature control of the punch, the forming draw ring and the non-forming draw ring, the temperature control including heating and cooling, wherein providing temperature control of the forming draw ring and the non-forming draw ring comprises:
constructing the forming draw ring and/or the non-forming draw ring to include different temperature control zones and independently controlling each of the temperature control zones; and
creating a ballistic helmet from one or more deep drawn helmet preforms.

12. A method for creating a deep drawn helmet preform, the method comprising:
supporting a stack of prepreg materials ("prepreg stack") between a forming aperture of a forming draw ring and a non-forming aperture of a non-forming draw ring, the forming draw ring and the non-forming draw ring each having a metal rigid body bounded by a contact surface and a non-contact surface opposed to the contact surface;
advancing the forming draw ring and the non-forming draw ring towards one another to form a clamped assembly of the forming draw ring, the prepreg stack and the non-forming draw ring, wherein a flange portion of the prepreg stack is clamped between the contact surfaces of the forming draw ring and a non-forming draw ring;
advancing the prepreg stack of the clamped assembly relative to a punch to form a deep drawn helmet preform, during which a clamping force is applied to the clamped assembly, and during which the punch enters and passes through the non-forming aperture and then draws the prepreg stack through the forming aperture and above the non-contact surface of the forming draw ring until a desired drawing depth of the prepreg stack is achieved; and
providing temperature control of the punch, the forming draw ring and the non-forming draw ring, the temperature control including heating and cooling;
wherein providing temperature control of the punch, the forming draw ring and the non-forming draw ring, the temperature control including heating and cooling comprises:
constructing the forming draw ring and/or the non-forming draw ring to include different temperature control zones and independently controlling each of the temperature control zones.

13. A method for forming a stack of prepreg material layers ("prepreg stack") into a deep drawn helmet preform, the method comprising:
locating a punch comprising a rigid body formed with an external surface thereof shaped to correspond with a desired internal surface of the helmet preform;
supporting the prepreg stack between a forming aperture of a forming draw ring and a non-forming aperture of a non-forming draw ring, the forming draw ring and the non-forming draw ring each having a metal rigid body bounded by a contact surface and a non-contact surface opposed to the contact surface;
clamping the prepreg stack between the forming aperture of the forming draw ring and the non-forming aperture of the non-forming draw ring to form a clamped assembly of the forming draw ring, the prepreg stack and the non-forming draw ring;
advancing the prepreg stack relative to the punch to form the deep drawn helmet preform, during which the system applies a clamping force to the clamped assembly, and during which the punch enters and passes through the non-forming aperture and then draws the prepreg stack through the forming aperture until a desired drawing depth of the prepreg stack is achieved;
connecting a temperature control system to the punch, the forming draw ring and the non-forming draw ring, the temperature control system providing heating and cooling, and the temperature control system providing temperature control of the punch, the forming draw ring and the non-forming draw ring; and
advancing an internal surface of a counterpunch relative to a top surface of the deep drawn helmet preform, the internal surface of the counterpunch being shaped to correspond with a desired shape of the deep drawn helmet preform.

* * * * *